(12) United States Patent
Ganapathy et al.

(10) Patent No.: US 11,716,642 B2
(45) Date of Patent: Aug. 1, 2023

(54) DETERMINATION OF EXTENDER ONBOARDING COMPLETION STATUS

(71) Applicant: ARRIS Enterprises LLC, Suwanee, GA (US)

(72) Inventors: Jalagandeswari Ganapathy, Bangalore (IN); Muralidharan Narayanan, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 136 days.

(21) Appl. No.: 17/240,051

(22) Filed: Apr. 26, 2021

(65) Prior Publication Data
US 2022/0022063 A1 Jan. 20, 2022

Related U.S. Application Data

(60) Provisional application No. 63/053,862, filed on Jul. 20, 2020.

(51) Int. Cl.
*H04W 24/08* (2009.01)
*G06F 3/14* (2006.01)
*H04B 7/155* (2006.01)
*H04L 43/0811* (2022.01)
*H04W 84/12* (2009.01)

(52) U.S. Cl.
CPC ............. *H04W 24/08* (2013.01); *G06F 3/14* (2013.01); *H04B 7/15507* (2013.01); *H04L 43/0811* (2013.01); *H04W 84/12* (2013.01)

(58) Field of Classification Search
CPC ..... H04W 24/08; H04W 84/12; H04W 16/26; H04W 8/183; H04W 76/18; H04W 48/16; G06F 3/14

USPC .......................................................... 370/252
See application file for complete search history.

(56) References Cited

U.S. PATENT DOCUMENTS

| | | | |
|---|---|---|---|
| 2015/0071052 A1 | 3/2015 | Hershberg et al. | |
| 2017/0272317 A1* | 9/2017 | Singla | H04L 67/02 |
| 2017/0325111 A1* | 11/2017 | Reese | H04L 67/12 |
| 2018/0183790 A1* | 6/2018 | Likar | H04W 12/50 |
| 2018/0306609 A1* | 10/2018 | Agarwal | G01D 5/00 |

OTHER PUBLICATIONS

International Search Report dated Aug. 13, 2021 in International (PCT) Application No. PCT/US2021/029094.
International Preliminary Report on Patentability dated Jan. 24, 2023 in International (PCT) Application No. PCT/US2021/029094.

* cited by examiner

*Primary Examiner* — Kwang B Yao
*Assistant Examiner* — Syed M Bokhari
(74) *Attorney, Agent, or Firm* — Wenderoth, Lind & Ponack, L.L.P.

(57) ABSTRACT

A system and a method are provided for a network access point device for use with a network extender device and a display device. The network access point device is configured to initiate an onboarding process to onboard the network extender device, to generate data to enable the display device to display a connecting status image when the onboarding process has started, to periodically check the connection state of the network extender device, and to generate data to enable the display device to display a connected status image after the network access point has been successfully onboarded.

8 Claims, 17 Drawing Sheets

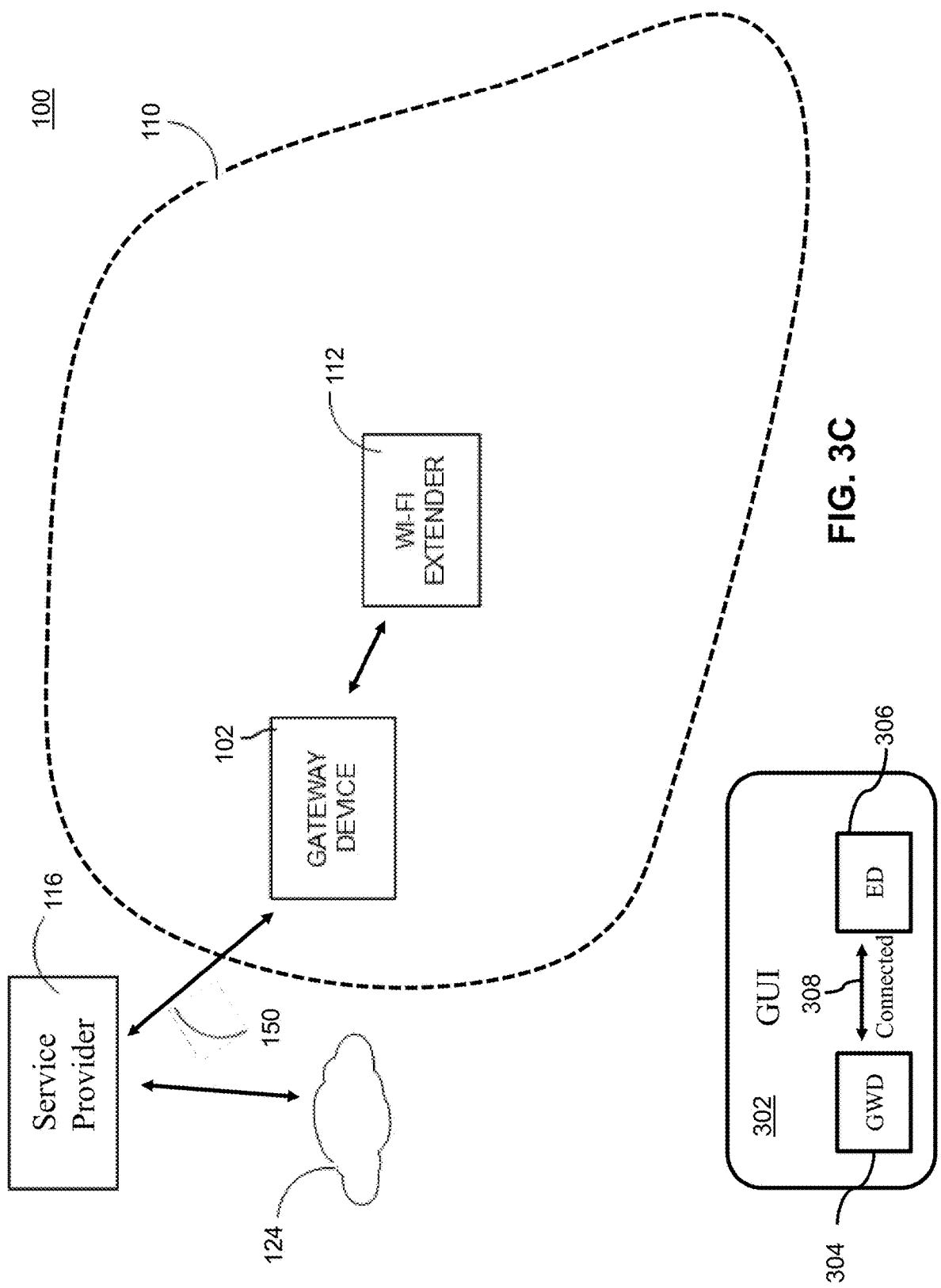

DETERMINATION OF EXTENDER ONBOARDING COMPLETION STATUS

BACKGROUND

Embodiments of the present disclosure relate to determining the onboarding status of a Wi-Fi extender.

SUMMARY

Aspects of the present disclosure are drawn to a network access point device for use with a network extender device and a display device. The network access point device includes a memory and a processor configured to execute instructions stored on the memory to cause the network access point device to: initiate an onboarding process to onboard the network extender device; generate connecting graphic user interface data, for use by the display device to display a connecting status image associated with an operation of the network access point device connecting with the network extender device after the onboarding process is initiated; periodically check a connection status of the network extender device, the connection status being in a first state or another state, the first state indicating that the network extender device is connected to the network access point device; and generate connected graphic user interface data, for use by the display device to display a connected status image associated with the network access point device being connected to the network extender device, after a current connection status and an immediately previous connection status both indicate the first state.

In some embodiments, the processor is configured to execute instructions stored on the memory to cause the network access point device to periodically check the connection status of the network extender device at a first interval. The processor may be further configured to execute instructions stored on the memory to cause the network access point device to periodically check the connection status of the network extender device at a second interval when one connection status is in the first state, where the second interval is less than the first interval.

In some embodiments, the processor is configured to execute instructions stored on the memory to cause the network access point device to generate connection failure graphic user interface data, for use by the display device to display a connection failure status image associated with the network access point device failing to connect to the network extender device, after expiration of a predetermined time period, and a current connection status and an immediately previous connection status both fail to indicate the first state.

Other aspects of the present disclosure are drawn to a method of operating a network access point device for use with a network extender device and a display device, the method comprising: initiating, via a processor, an onboarding process to onboard the network extender device; generating, via the processor, connecting graphic user interface data, for use by the display device to display a connecting status image associated with an operation of the network access point device connecting with the network extender device, after the onboarding process is initiated; periodically checking, via the processor, a connection status of the network extender device, the connection status being in a first state or another state, the first state indicating that the network extender device is connected to the network access point device; and generating, via the processor, connected graphic user interface data, for use by the display device to display a connected status image associated with the network access point device being connected to the network extender device, after a current connection status and an immediately previous connection status both indicate the first state.

In some embodiments, the method periodically checking the connection status of the network extender device comprises periodically checking the connection status of the network extender device at a first interval. Additionally, the method further comprises periodically checking, via the processor, the connection status of the network extender device at a second interval when one connection status is in the first state, wherein the second interval is less than the first interval.

In some embodiments, the method further comprises generating, via the processor, connection failure graphic user interface data, for use by the display to display a connection failure status image associated with the network access point device failing to connect to the network extender device, after expiration of a predetermined time period, and a current connection status and an immediately previous connection status both fail to indicate a first state.

Other aspects of the present disclosure are drawn to a non-transitory, computer-readable media having computer-readable instructions stored thereon, the computer-readable instructions being capable of being read by a network access point device for use with a network extender device and a display device, wherein the computer-readable instructions are capable of instructing the network access point device to perform the method comprising: initiating, via a processor, an onboarding process to onboard the network extender device; generating, via the processor, connecting graphic user interface data, for use by the display device to display a connecting status image associated with an operation of the network access point device connecting with the network extender device, after the onboarding process is initiated; periodically checking, via the processor, a connection status of the network extender device, the connection status being in a first state or another state, the first state indicating that the network extender device is connected to the network access point device; and generating, via the processor, connected graphic user interface data, for use by the display device to display a connected status image associated with the network access point device being connected to the network extender device, after a current connection status and an immediately previous connection status both indicate the first state.

In some embodiments, the computer-readable instructions are capable of instructing the network access point device to perform the method wherein the periodic checking the connection status of the network extender device comprises periodically checking the connection status of the network extender device at a first interval. Additionally, the computer-readable instructions are capable of instructing the network access point device to perform the method further comprising: periodically checking, via the processor, the connection status of the network extender device at a second interval when one connection status is in the first state, wherein the second interval is less than the first interval.

In some embodiments, the computer-readable instructions are capable of instructing the network access point device to perform the method further comprising generating, via the processor, connection failure graphic user interface data, for use by the display to display a connection failure status image associated with the network access point device failing to connect to the network extender device, after expiration of a predetermined time period, and a current connection status and an immediately previous connection status both fail to indicate a first state.

Other aspects of the present disclosure are drawn to a client device for use with a network access point device and a network extender device, the client device comprising: a display; a memory; and a processor configured to execute instructions stored on the memory to cause the client device to: initiate an onboarding process to onboard the network extender device to the network access point device; receive, from the network access point device, connecting graphic user interface data for use by the display to display a connecting status image associated with an operation of the network access point device connecting with the network extender device, after the onboarding process is initiated; and receive, from the network access point device, connected graphic user interface data for use by the display to display a connected status image associated with the network access point device being connected to the network extender device, wherein the graphic user interface data for use by the display to display a connected status image is derived from a current check of a current connection status of the network extender device and an immediately previous check of an immediately previous connection status of the network extender device, wherein the connection status being in a first state or another state, wherein the first state indicating that the network extender device is connected to the network access point device, and wherein the current connection status and the immediately previous connection status both indicate the first state.

Other aspects of the present disclosure are drawn to a method of operating a client device for use with a network access point device and a network extender device, the method comprising: initiating, via a processor, an onboarding process to onboard the network extender device to the network access point device; receiving, via the processor and from the network access point device, connecting graphic user interface data for use by a display to display a connecting status image associated with an operation of the network access point device connecting with the network extender device, after the onboarding process is initiated; and receiving, via the processor and from the network access point device, connected graphic user interface data for use by the display to display a connected status image associated with the network access point device being connected to the network extender device, wherein the graphic user interface data for use by the display to display a connected status image is derived from a current check of a current connection status of the network extender device and an immediately previous check of an immediately previous connection status of the network extender device, wherein the connection status being in a first state or another state, wherein the first state indicating that the network extender device is connected to the network access point device, and wherein the current connection status and the immediately previous connection status both indicate the first state.

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIG. 3C illustrates the conventional communication system of FIG. 3A at a time $t_3$;

DETAILED DESCRIPTION

Wi-Fi extenders are used within wireless local area networks (WLANs) to extend the reach of Wi-Fi signals. Wi-Fi extenders connect to gateway devices through a process known as pairing or onboarding. When a Wi-Fi extender is initially connecting to a gateway device, it is not unusual for the connection to drop more than once during the onboarding process. A user who sees multiple dropped connections during the onboarding process may incorrectly assume that a Wi-Fi extender is defective.

Figure 1:
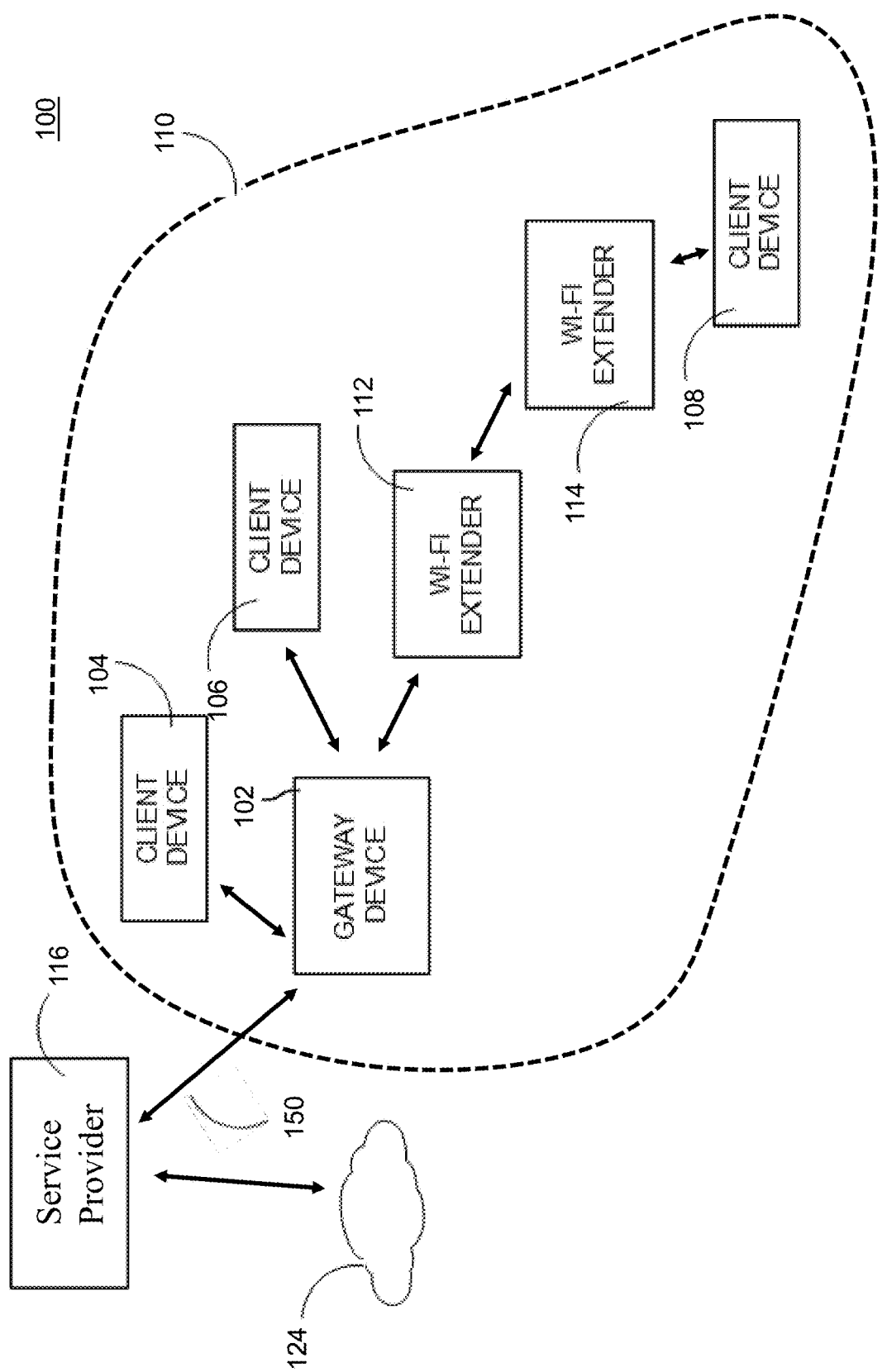
FIG. 1 illustrates structural components implementing an electronic communication network.

FIG. 1 illustrates structural components implementing an electronic communication network 100.

As shown in the figure, electronic communication network 100 includes: a gateway device 102; a plurality of client devices, a sample of which are illustrated as a client device 104, a client device 106, and a client device 108; a plurality of Wi-Fi extenders, a sample of which are illustrated as Wi-Fi extender 112, Wi-Fi extender 114; a service provider 116; an external network 124, e.g., the Internet; physical media/wiring 150; and a wireless local area network 110.

A gateway device, also referred to as a gateway, residential gateway, or RG, is an electronic device that is to be located so as to establish a local area network (LAN) at a consumer premises. The consumer premises can include a residential dwelling or business of a user. The terms home and premises may be used synonymously herein.

Gateway device 102 may be any device or system that is operable to allow data to flow from one discrete network to another, which in this example is from WLAN 110 in FIG.

1 to external network 124, e.g., the Internet. Gateway device 102 may perform such functions as link layer and physical layer outroute coding and modulation (e.g., DVB S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 102 establishes, or is part of, WLAN 110, using Wi-Fi for example, such that client devices 104, 106, and 108, and Wi-Fi extenders 112 and 114 are able to communicate wirelessly with gateway device 102. In particular, gateway device 102 is able to communicate wirelessly directly with client devices 104 and 106 and Wi-Fi extender 112. Further, gateway device 102 is able to communicate wirelessly with Wi-Fi extender 114 via Wi-Fi extender 112 and is able to communicate wirelessly with client device 108 via Wi-Fi extender 112 and Wi-Fi extender 114. The term Wi-Fi as used herein may be considered to refer to any of Wi-Fi 4, 5, 6, 6E, or any variation thereof.

Further, it should be noted that gateway device 102 is able to communicate with service provider 116 via physical media/wiring 150.

Service provider 116 includes head-end equipment such as server computers (e.g., automatic configuration server ACS) that enable a content provider, such as a cable television provider, a satellite television provider, an internet service provider, or multiple-systems operator (MSO), to provide content (such as audio/video content and/or internet service) either through physical media/wiring, such as a coaxial network, an optical fiber network, and/or DSL, or external network 124, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a public switched data network (PSDN), a global Telex network, or a 2G, 3G, 4G or 5G network accessible via physical media/wiring. In general, such networks can also be contextually referred to herein as the Internet or the cloud.

Gateway device 102 serves as a gateway or access point to external network 124, e.g., the Internet (or otherwise as mentioned above), for one or more electronic devices, referred to generally herein as client devices 104, 106, and 108 that wirelessly communicate with gateway device 102 via, e.g., Wi-Fi. Client devices 104, 106, and 108 can be desktop computers, laptop computers, electronic tablet devices, smart phones, appliances, or any other so-called Internet of things equipped devices that are equipped to communicate information via WLAN 110.

Wi-Fi extenders 112 and 114 can be paired with gateway device 102 in order to communicate wirelessly with gateway device 102 and extend the coverage area of WLAN 110. Any of the client devices 104, 106, and 108 can be in communication with gateway device 102 or any of Wi-Fi extenders 112 and 114.

Gateway device 102 has the capability of wirelessly communicating with plural electronic user devices over respective communication avenues. In order to extend the area in which WLAN 110 is effective, beyond the radio reach of gateway device 102, one of Wi-Fi extenders 112 and 114 can be added. The establishment of the operative communications between Wi-Fi extender 112 and gateway device 102 (or between Wi-Fi extender 114 and an already established Wi-Fi extender 112) is referred to as onboarding the extender. The Wi-Fi extenders 112 and 114 can communicate wirelessly with gateway device 102. However, rather than using one of the communication avenues that are allocated for communication with user devices, a dedicated avenue of communication may be established, at least at some times, between the Wi-Fi extender and gateway device 102. This dedicated avenue is referred to as a backhaul.

Within WLAN 110, electronic devices are often referred to as being stations in WLAN 110. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

A wireless access point (WAP), or more generally just access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In WLAN 110, gateway device 102 and Wi-Fi extenders 112 and 114 are access points for WLAN 110.

A more detailed description of gateway device 102 and Wi-Fi extender 112 will be described with reference to FIG. 2.

Figure 2:
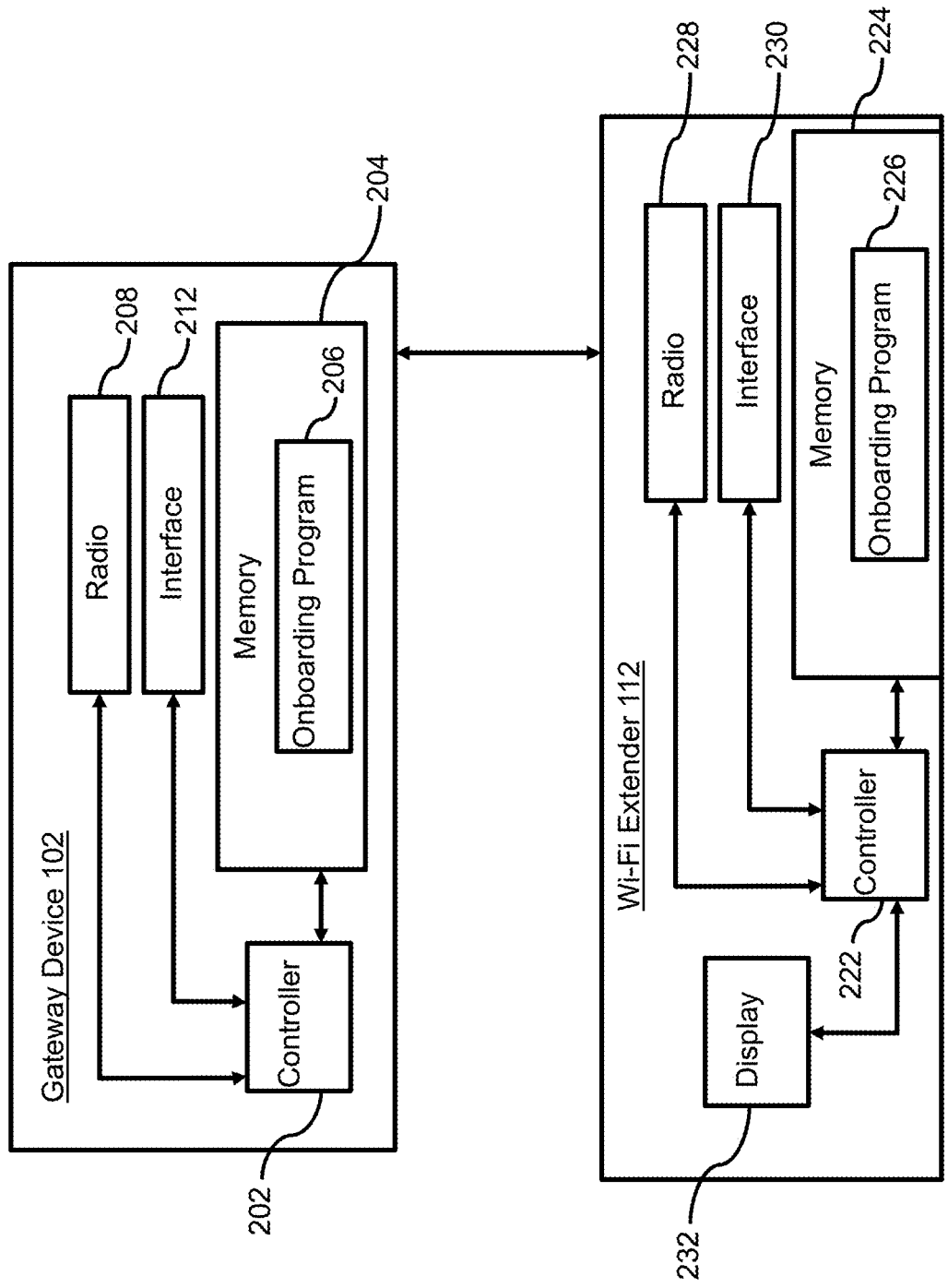
FIG. 2 illustrates an exploded view of a gateway device and a Wi-Fi extender of FIG. 1.

FIG. 2 illustrates an exploded view of gateway device 102 and Wi-Fi extender 112 of FIG. 1.

As shown in FIG. 2, gateway device 102 includes: a controller 202; a memory 204, which has stored therein an onboarding program 206; at least one radio, a sample of which is illustrated as a radio 208; and an interface circuit 212.

In this example, controller 202, memory 204, radio 208, and interface circuit 212 are illustrated as individual devices. However, in some embodiments, at least two of controller 202, memory 204, radio 208, and interface circuit 212 may be combined as a unitary device. Whether as individual devices or as combined devices, controller 202, memory 204, radio 208, and interface circuit 212 may be implemented as any combination of an apparatus, a system and an integrated circuit. Further, in some embodiments, at least one of controller 202, memory 204 and interface circuit 212 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. Alternatively, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 202 can include a dedicated control circuit, CPU, microprocessor, etc. Controller 202 controls the circuits of gateway device 102. Memory 204 can store various programming, user content, and data. Interface circuit 212 can include one or more connectors, such as RF connectors, or Ethernet connectors, and/or wireless communication circuitry, such as 5G circuitry and one or more antennas. Interface circuit 212 receives content from service provider 116 (as shown in FIG. 1) by known methods, non-limiting examples of which include terrestrial antenna, satellite dish, wired cable, DSL, optical fibers, or 5G as discussed above. Through interface circuit 212, gateway device 102 receives an input signal, including data and/or audio/video content, from service provider 116 and can send data to service provider 116.

Radio 208, (and preferably two or more radios), may also be referred to as a wireless communication circuit, such as a Wi-Fi WLAN interface radio transceiver and is operable to communicate with client devices 104, 106, and 108, and with Wi-Fi extenders 112 and 114. Radio 208 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols. Gateway device 102 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, Zigbee protocol, and/or IEEE 802.15.4 protocol, which also communicates in the ISM band.

Wi-Fi extender 112 includes: a controller 222; a memory 224, which has stored therein an onboarding program 226; at least one radio, a sample of which is illustrated as a radio 228; an interface circuit 230; and a display 232. It should be noted that additional Wi-Fi extenders, including Wi-Fi extender 114, have similar structure and operation to that of Wi-Fi extender 112.

In this example, controller 222, memory 224 and radio 228 are illustrated as individual devices. However, in some embodiments, at least two of controller 222, memory 224 and radio 228 may be combined as a unitary device. Further, in some embodiments, at least one of controller 222 and memory 224 may be implemented as a computer having tangible computer-readable media for carrying or having computer-executable instructions or data structures stored thereon.

Insofar as gateway device 102 provides connection to service provider 116, such as an MSO, gateway device 102 can be equipped with connectors to connect with a television or display device, and can also include programming to execute an electronic program guide and/or other suitable graphical user interface (GUI), and can with such configuration be referred to as a so called set top box. Such a set top box can be included in the system shown in FIG. 1 as gateway device 102 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so called smart media device.

For purposes of this discussion, consider a situation where a user of a WLAN wants to extend the reach of a Wi-Fi signal. For example, consider a situation where a user has a home with an office. The user wants to use a laptop computer in the home office, but the Wi-Fi signal does not reach the home office. The user decides to add a Wi-Fi extender to the WLAN so that the Wi-Fi signal reaches the home office. The user monitors the onboarding status with software provided by the Wi-Fi extender vendor. During the onboarding process, the Wi-Fi extender repeatedly connects and disconnects to the gateway device and the user is able to see this repeating process. Because the user is not aware that a Wi-Fi extender may drop its connection to the gateway device more than once during the onboarding process, the user may incorrectly assume that the Wi-Fi extender is defective. As a result, a user may call a technician to determine whether or not the Wi-Fi extender is defective, or the user may decide to return the Wi-Fi extender because they believe it is defective.

In short, when Wi-Fi extender 112 onboards onto gateway device 102, Wi-Fi extender 112 generally follows these operations: 1) Wi-Fi extender 112 establishes a backhaul connection with gateway device 102; 2) Wi-Fi extender 112 then received connectivity with external network 124; 3) Wi-Fi extender 112 then receives auto-configuration instructions from gateway device 102, which results in a restart of radio 228; 4) Wi-Fi extender 112 upgrades its software and again reboots; 5) Wi-Fi extender 112 re-establishes the backhaul connection with gateway device 102; 6) Wi-Fi extender 112 again receives connectivity with external network 124; and 7) again receives auto-configuration instructions from gateway device 102, which again results in a restart of radio 228. After each of operations (3), (4), and (7), Wi-Fi extender 112 briefly disconnects from WLAN 110. A graphic user interface that tracks the onboarding of Wi-Fi extender 112 onto gateway device 102 will illustrated that Wi-Fi extender 112 is disconnected during each of operations (3), (4), and (7), which may cause confusion and/or frustration with a user who is monitoring the onboarding process. This will be discussed in more detail with respect to FIGS. 3A-E.

A conventional method for onboarding a Wi-Fi extender will be described with reference to FIGS. 3A-E.

FIGS. 3A-E illustrate structural components of an alternate configuration of conventional communication system 100 at five different times respectively during which a Wi-Fi extender is being onboarded. Communication system 100 is illustrated at a time $t_1$ in FIG. 3A, at a time $t_2$ in FIG. 3B, at a time $t_3$ in FIG. 3C, at a time $t_4$ in FIG. 3D, and at a time $t_5$ in FIG. 3E.

Figure 3A:
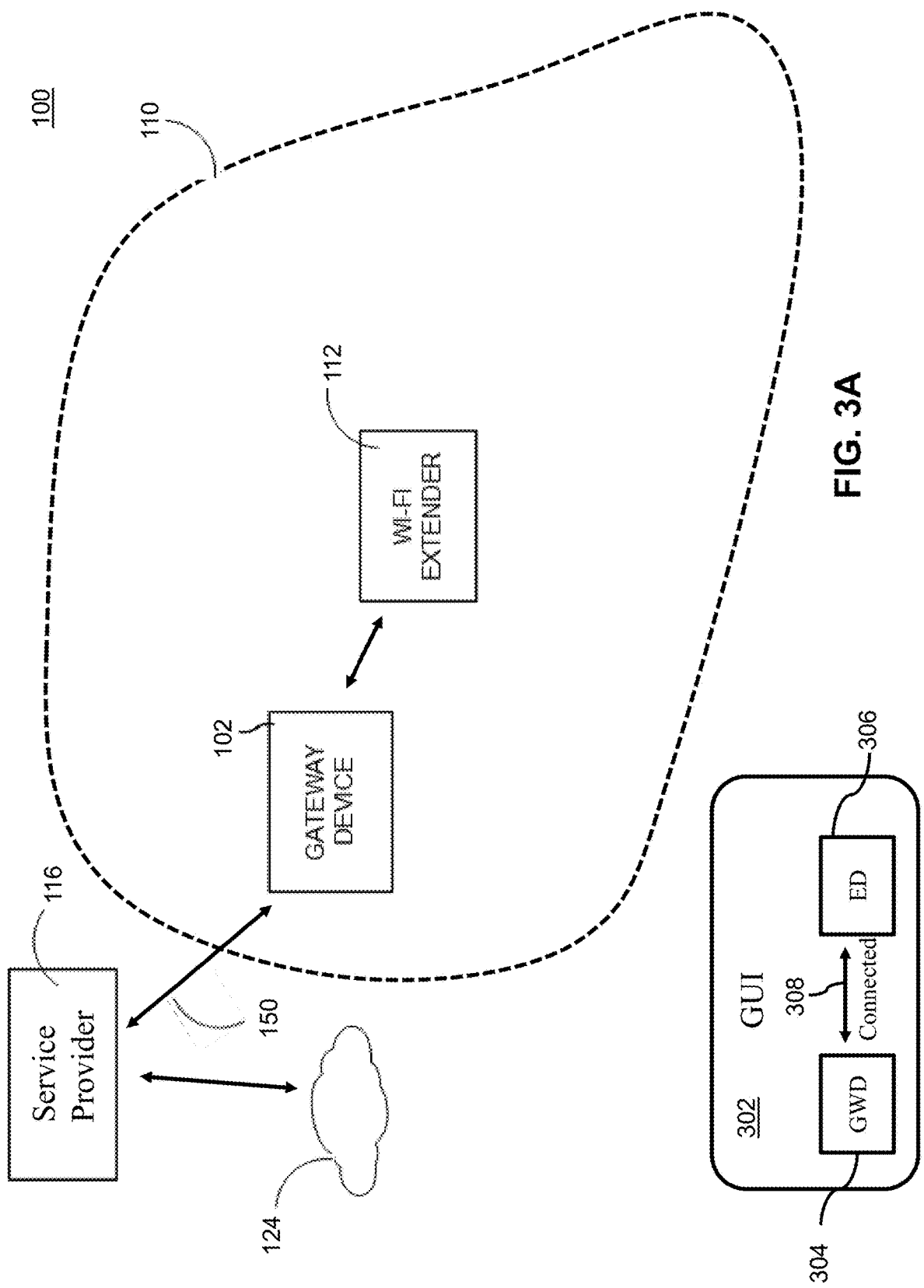
FIG. 3A illustrates a conventional communication system at a time $t_1$.

As shown in FIG. 3A, communication system 100 includes WLAN 110; Wi-Fi extender 112; gateway device 102; service provider 116; external network 124, e.g., the Internet; a graphical user interface (GUI) 302; a gateway device (GWD) image 304; an extender device (ED) image 306; and a connected status image 308.

Gateway device 102 is arranged to communicate wirelessly with Wi-Fi extender 112. Gateway device 102 is additionally arranged to communicate with external network 124 by way of service provider 116 and physical media/wiring 150.

GUI 302 is configured to show the user whether or not a connection exists between gateway device 102 and Wi-Fi extender 112 by way of GWD image 304, ED image 306, and connected status image 308. GUI 302 can exist on a desktop computer, laptop computer, electronic tablet device, smart phone, appliance, network access point, or any other so-called internet of things equipped device that is equipped to communicate information via WLAN 110.

In operation, at time $t_1$, a user is attempting to onboard Wi-Fi extender 112 to gateway device 102. As shown in FIG. 3A, Wi-Fi extender 112 is connected to gateway device 102 as indicated by the solid arrow between Wi-Fi extender 112 and gateway device 102. GUI 302 is displaying to the user that there exists a connection between Wi-Fi extender 112 and gateway device 102 by way of connected status image 308 showing a connection between GWD image 304 and ED image 306. However, there may be times during the onboarding process when the connection between gateway device 102 and Wi-Fi extender 112 is dropped. This will be described with reference to FIG. 3B.

Figure 3B:
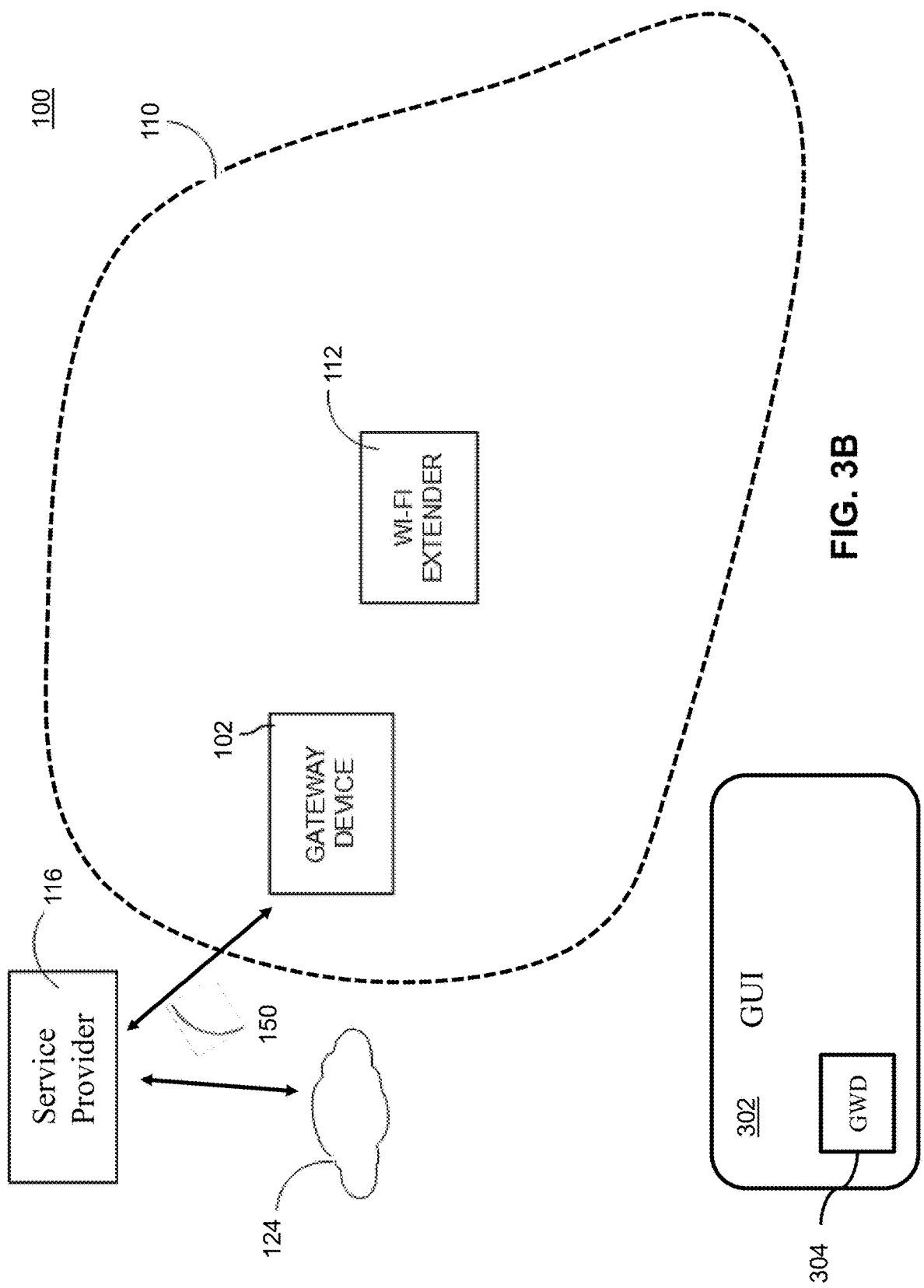
FIG. 3B illustrates the conventional communication system of FIG. 3A at a time $t_2$.

FIG. 3B illustrates conventional communication system 100 of FIG. 3A at time $t_2$.

In operation, at time $t_2$, the onboarding process is not complete. As shown in FIG. 3B, Wi-Fi extender 112 has dropped the connection to gateway device 102 as indicated by no arrow between Wi-Fi extender 112 and gateway device 102. GUI 302 is indicating to the user that there is no connection between Wi-Fi extender 112 and gateway device 102 by only displaying GWD image 304. During a standard onboarding process, it is normal for a Wi-Fi extender and gateway device to reconnect after disconnecting. This will be described with reference to FIG. 3C.

FIG. 3C illustrates conventional communication system 100 of FIG. 3A at time $t_3$.

In operation, at time $t_3$, the onboarding process is not complete. As shown in FIG. 3C, Wi-Fi extender 112 has reconnected to gateway device 102 as indicated by the solid arrow between Wi-Fi extender 112 and gateway device 102. GUI 302 is, again, displaying to the user that there exists a connection between Wi-Fi extender 112 and gateway device 102 by way of connected status image 308 showing a connection between GWD image 304 and ED image 306.

During a standard onboarding process, it is normal for a Wi-Fi extender and gateway device to disconnect again, even after previously disconnecting and reconnecting. This will be described with reference to FIG. 3D.

Figure 3D:
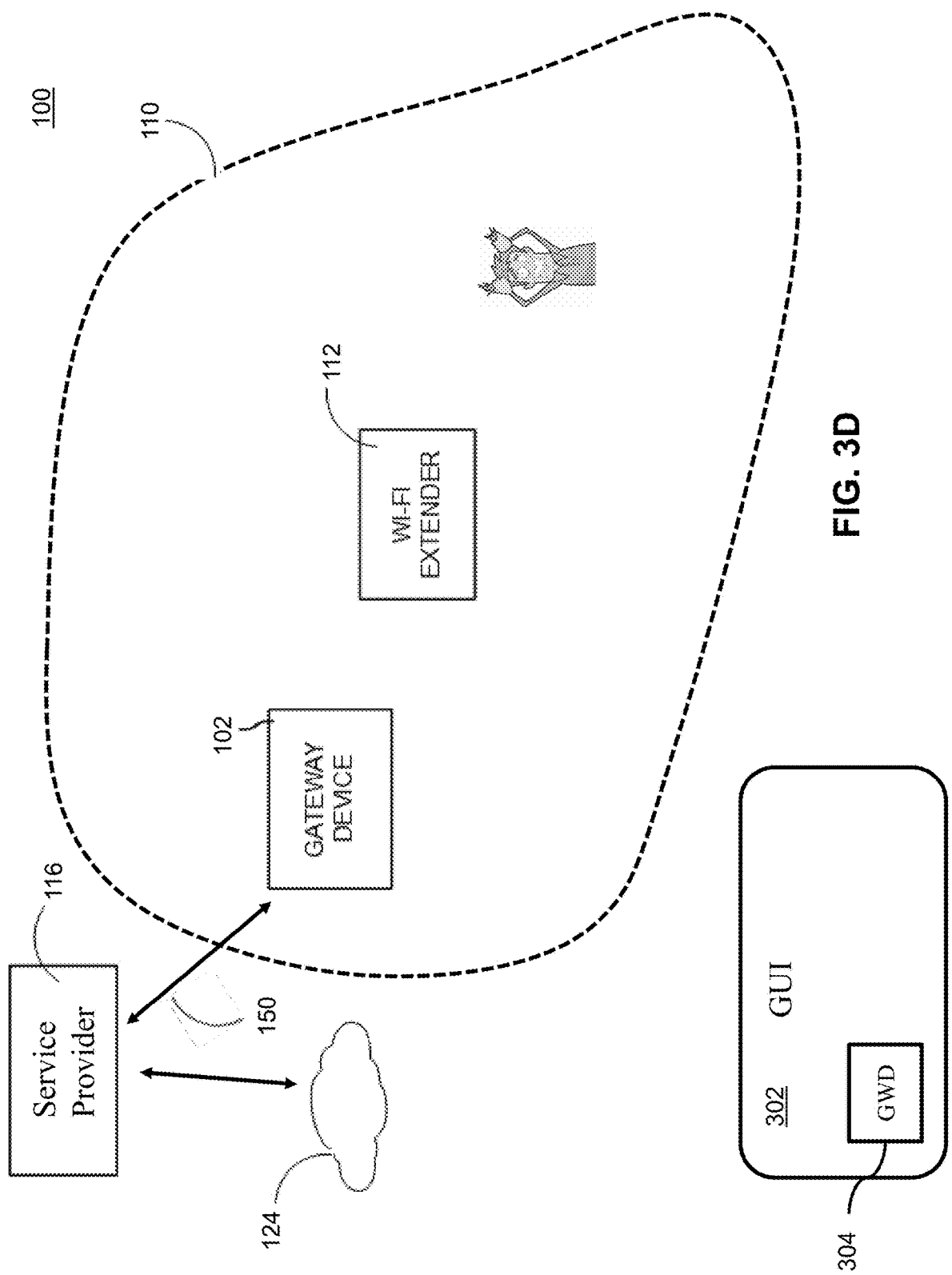
FIG. 3D illustrates the conventional communication system of FIG. 3A at a time $t_4$.

FIG. 3D illustrates conventional communication system 100 of FIG. 3A at time $t_4$.

In operation, at time $t_4$, the onboarding process is not complete. As shown in FIG. 3D, Wi-Fi extender 112 has, again, dropped the connection to gateway device 102 as indicated by no arrow between Wi-Fi extender 112 and gateway device 102. GUI 302 is, again, indicating to the user that there is no connection between Wi-Fi extender 112 and gateway device 102 by only displaying GWD image 304. During a standard onboarding process, it is normal for a Wi-Fi extender and gateway device to reconnect after disconnecting. This will now be described with reference to FIG. 3E.

Figure 3E:
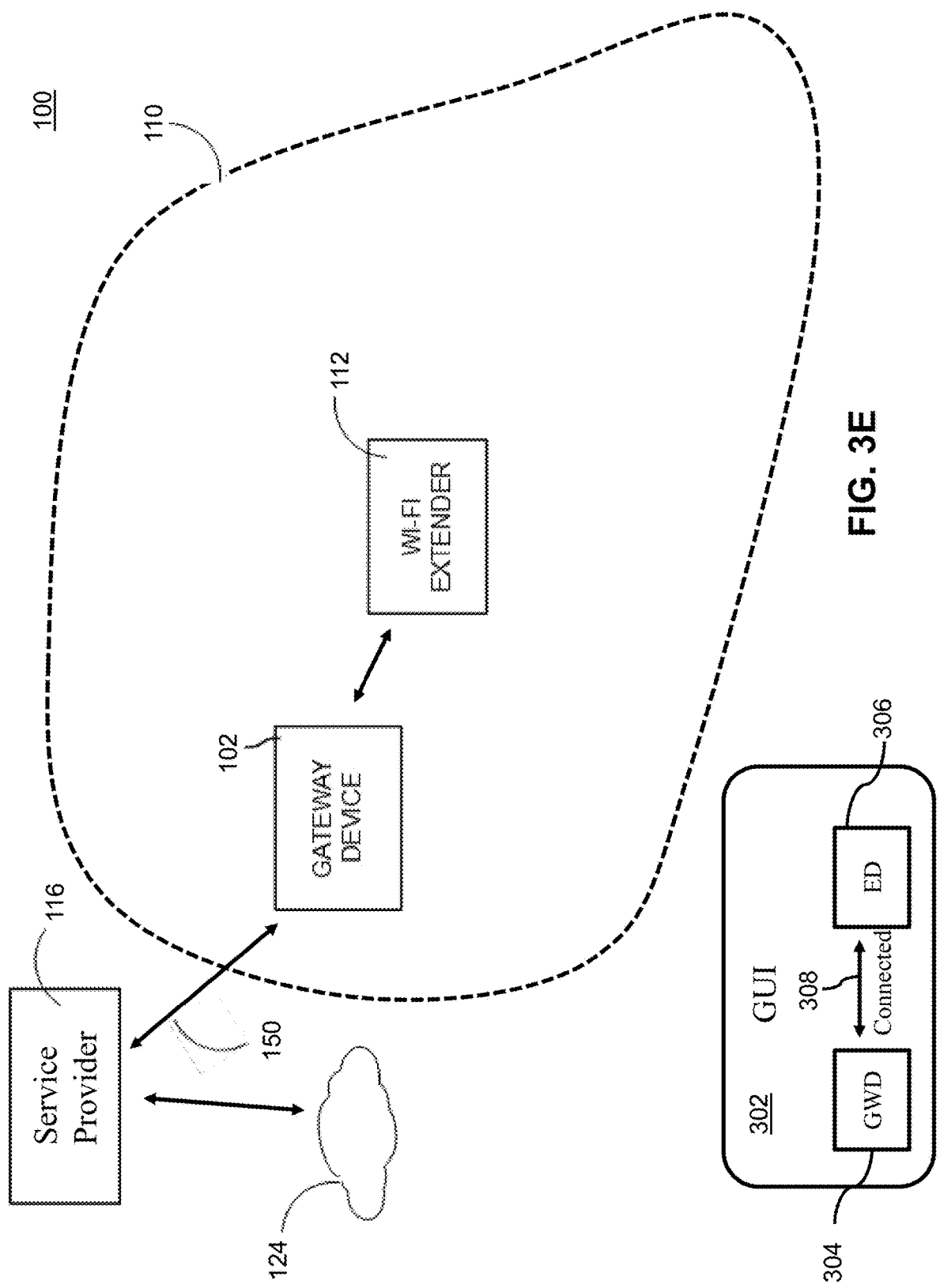
FIG. 3E illustrates the conventional communication system of FIG. 3A at a time $t_5$.

FIG. 3E illustrates conventional communication system 100 of FIG. 3A at time $t_5$.

In operation, at time $t_5$, the onboarding process is complete. As shown in FIG. 3E, Wi-Fi extender 112 has reconnected to gateway device 102 as indicated by the solid arrow between Wi-Fi extender 112 and gateway device 102. GUI 302 is displaying to the user that there exists a connection between Wi-Fi extender 112 and gateway device 102 by way of connected status image 308 showing a connection between GWD image 304 and ED image 306.

What is needed is a system and method for onboarding a Wi-Fi extender without the user seeing the multiple dropped connections that often occur during the onboarding process.

A system and method in accordance with the present disclosure provides a GUI that indicates that a Wi-Fi extender is being onboarded and simultaneously prevents the user from seeing the multiple dropped connections that may occur during the onboarding process, thereby eliminating the need to unnecessarily return or service a non-defective Wi-Fi extender. In addition, the system and method in accordance with the present disclosure provides a method for determining the final onboarding status of the Wi-Fi extender to the gateway before indicating to the user through the GUI that the Wi-Fi has successfully completed the onboarding process.

In accordance with the present disclosure, when a user is first attempting to onboard a Wi-Fi extender, the user will be presented with a connecting status image to indicate that the onboarding process has been initiated. During the onboarding process, the connection status is checked at a first interval. Then a period of time elapses. Then the connection status is checked at a second interval. If the Wi-Fi extender is connected at both the first period and the second period, it is determined that the Wi-Fi extender has successfully connected to the gateway, and the image the user sees on the GUI changes from a connecting status image to a connected status image. If the Wi-Fi extender has not successfully connected to the gateway device during either the first period, or the second period, the checking process started over again. A connected status image is not shown to the user until the Wi-Fi extender has been determined to be successfully connected to the gateway device during two consecutive periods of time.

The present disclosure provides an improved user experience because it masks the frequent dropped connections that occur during the onboarding process from the user, thus preventing the user from incorrectly believing that a Wi-Fi device is faulty when it is simply onboarding.

An example system and method for determining the onboarding status of a Wi-Fi extender in accordance with aspects of the present disclosure will now be described in greater detail with reference to FIGS. 4-8.

Figure 4:
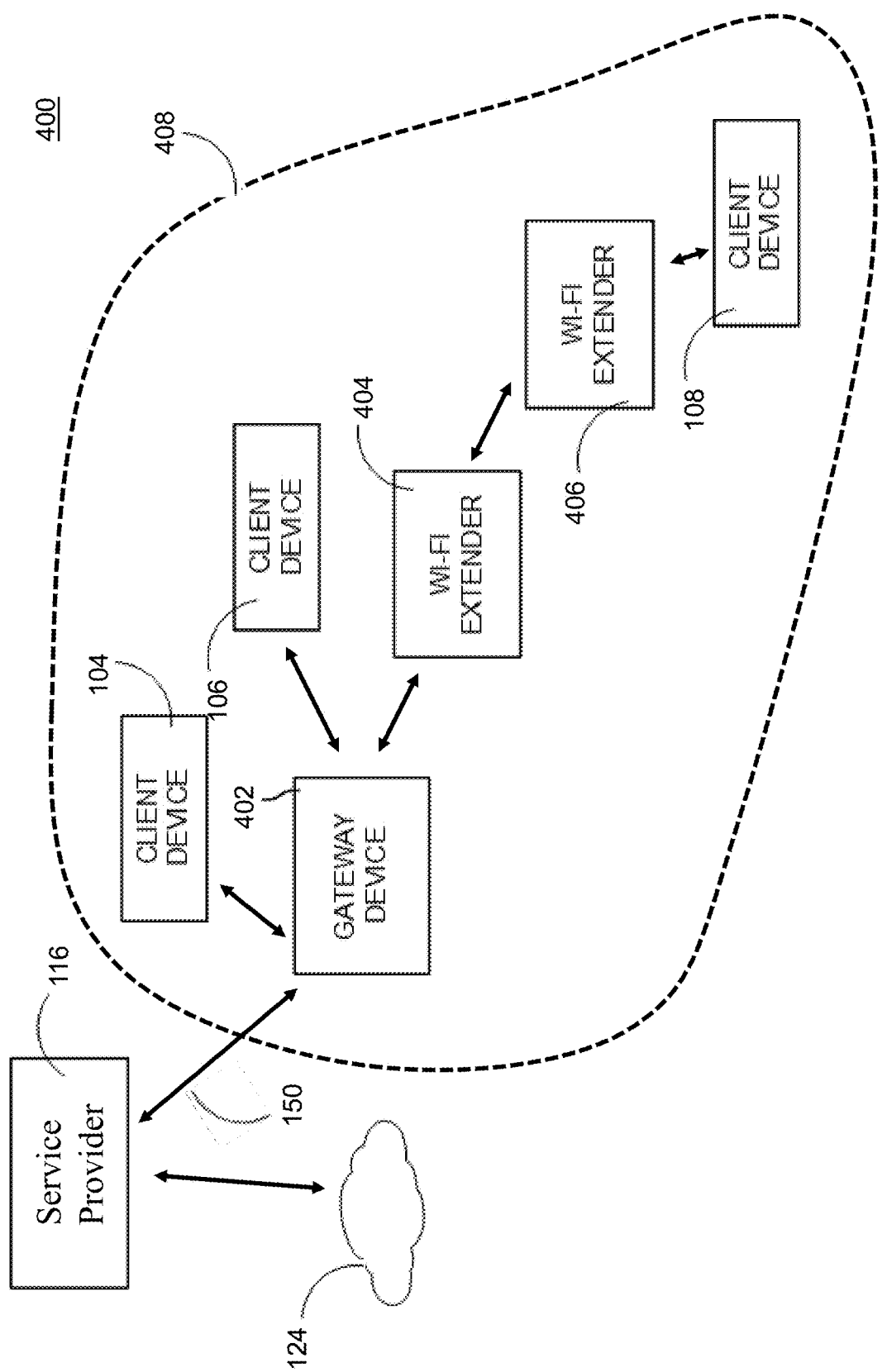
FIG. 4 illustrates a communication system in accordance with aspects of the present disclosure.

FIG. 4 illustrates a communication system 400 in accordance with aspects of the present disclosure.

As shown in the figure, communication system 400 includes a gateway device 402; client device 104, client device 106, and client device 108; a Wi-Fi extender 404 and a Wi-Fi extender 406; a WLAN 408; service provider 116; physical media/wiring 105; and external network 124, e.g., the Internet.

Gateway device 402 is arranged to communicate with external network 124 by way of service provider 116. Gateway device 402 is additionally arranged to communicate wirelessly directly with client device 104, client device 106, and Wi-Fi extender 404. Further, gateway device 402 is additionally arranged to communicate with Wi-Fi extender 406 by way of Wi-Fi extender 404. Further, gateway device 402 is additionally arranged to communicate with client device 108 by way of Wi-Fi extender 406 and Wi-Fi extender 404.

Just as with the system discussed above with reference to FIG. 2, in accordance with the present disclosure, when Wi-Fi extender 404 onboards onto gateway device 402, Wi-Fi extender 404 generally follows these operations: 1) Wi-Fi extender 404 establishes a backhaul connection with gateway device 402; 2) Wi-Fi extender 404 then received connectivity with external network 124; 3) Wi-Fi extender 404 then receives auto-configuration instructions from gateway device 402, which results in a restart of its radio; 4) Wi-Fi extender 404 upgrades its software and again reboots; 5) Wi-Fi extender 404 re-establishes the backhaul connection with gateway device 402; 6) Wi-Fi extender 404 again receives connectivity with external network 124; and 7) again receives auto-configuration instructions from gateway device 402, which again results in a restart of its radio. After each of operations (3), (4), and (7), Wi-Fi extender 404 briefly disconnects from WLAN 408.

However, different from the system discussed above with reference to FIG. 2, in accordance with the present disclosure, a graphic user interface that tracks the onboarding of Wi-Fi extender 404 onto gateway device 402 will not illustrated that Wi-Fi extender 404 is disconnected during each of operations (3), (4), and (7). On the contrary, in accordance with the present disclosure, a graphic user interface that tracks the onboarding of Wi-Fi extender 404 onto gateway device 402 will illustrate that Wi-Fi extender 112 is connecting during each of operations (1)-(7), which will eliminate confusion and/or frustration from a user who is monitoring the onboarding process. An example embodiment of determining the onboarding status of Wi-Fi extender 404 of FIG. 4 will now be described in greater detail with reference to FIG. 5.

Figure 5:
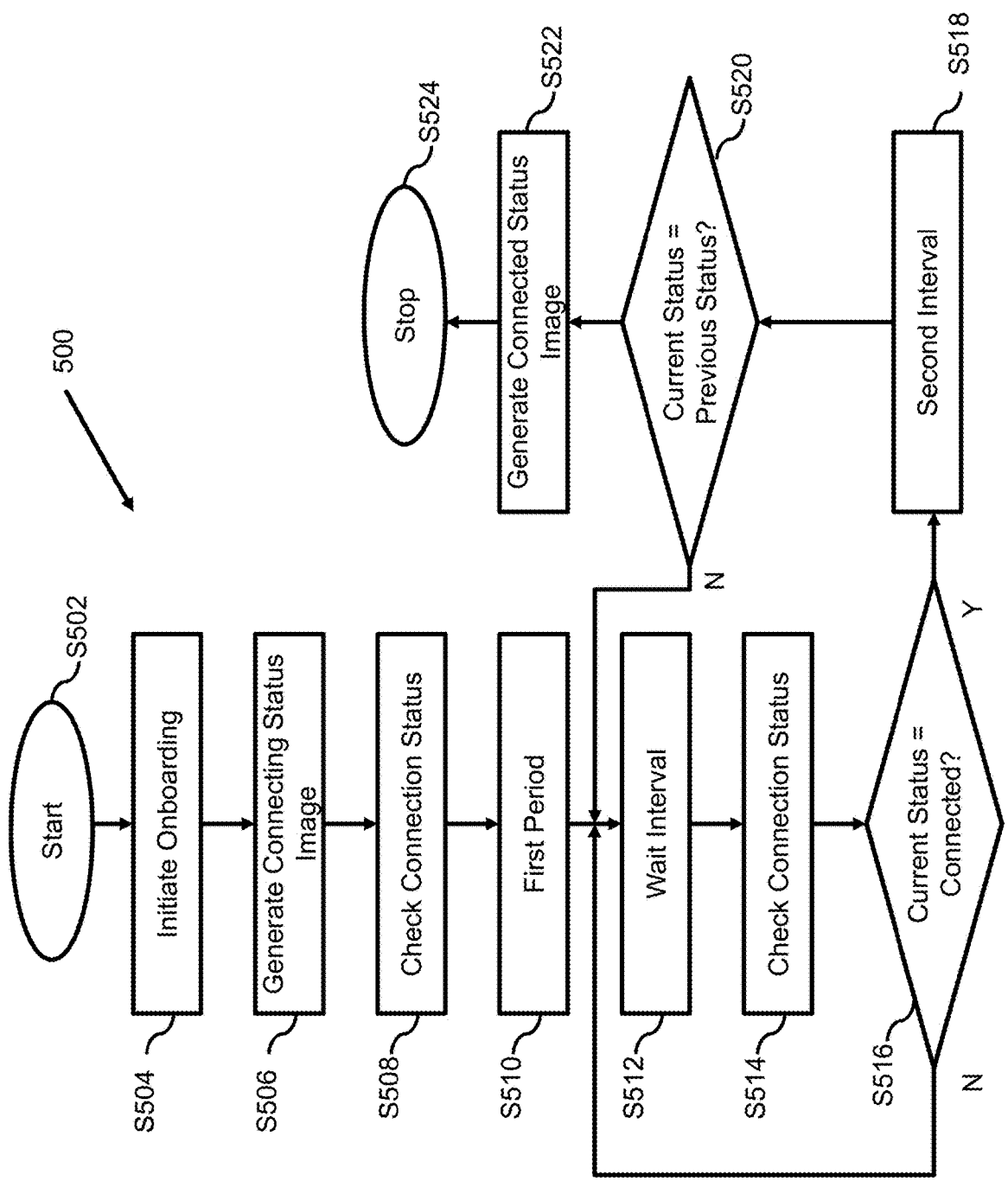
FIG. 5 illustrates an example method for determining the onboarding status of a Wi-Fi extender and displaying the onboarding status on an associated client device in accordance with aspects of the present disclosure.

FIG. 5 illustrates an example algorithm 500 to be executed by a processor for determining the onboarding status of a Wi-Fi extender and displaying the onboarding status on an associated client device in accordance with aspects of the present disclosure. This will be described in more detail with reference to FIG. 8.

Figure 8:
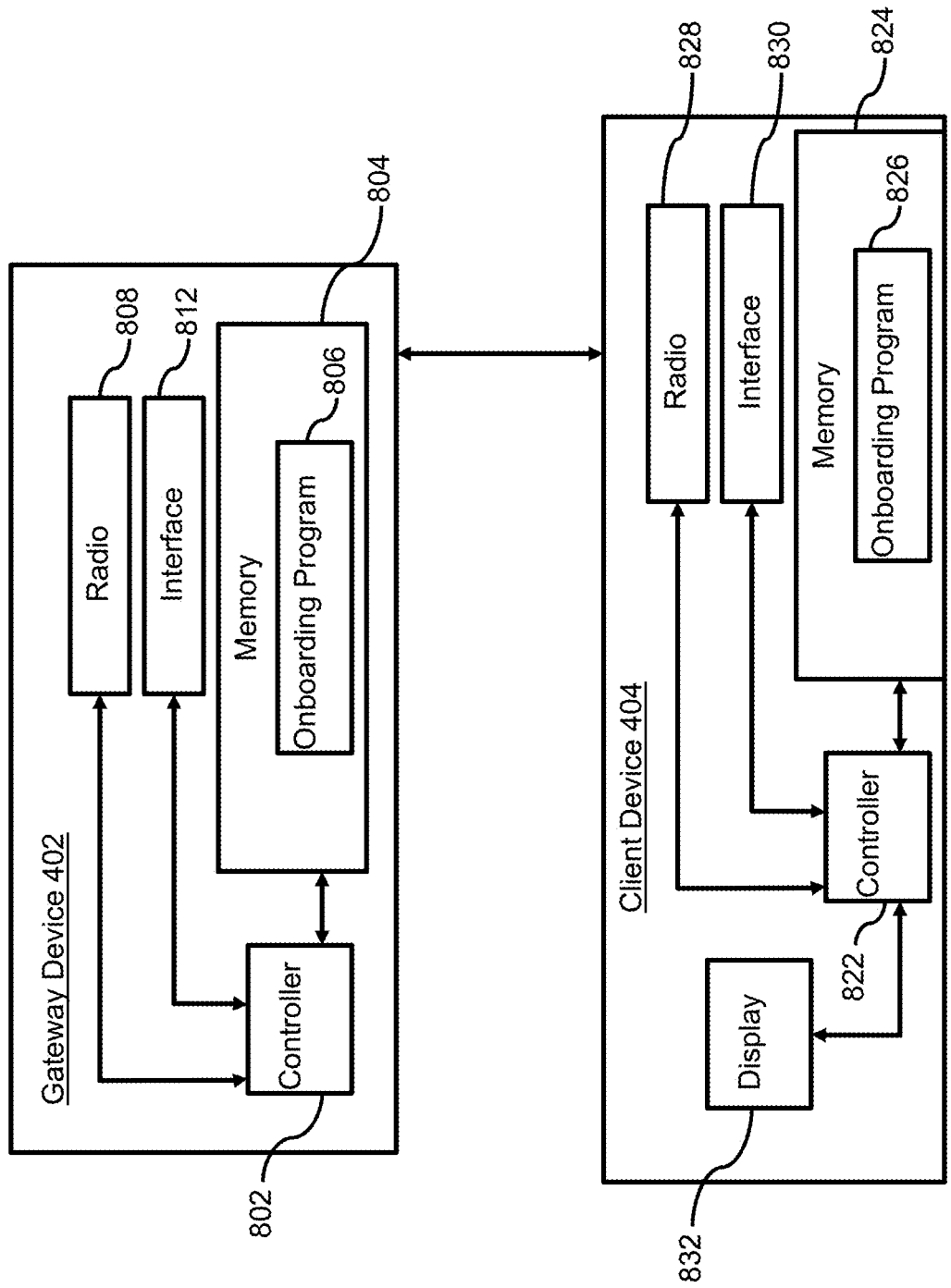
FIG. 8 illustrates an exploded view of a gateway device and a client device in accordance with aspects of the present disclosure.

FIG. 8 illustrates an exploded view of gateway device 402 and a client device 404.

As shown in FIG. 8, gateway device 402 includes: a controller 802; a memory 804, which has stored therein an onboarding program 806; at least one radio, a sample of which is illustrated as radio 808; and interface circuit 812.

In this example, controller 802, memory 804, radio 808, and interface circuit 812 are illustrated as individual devices. However, in some embodiments, at least two of controller 802, memory 804, radio 808, and interface circuit 812 may be combined as a unitary device. Whether as individual devices or as combined devices, controller 802, memory 804, radio 808, and interface circuit 812 may be implemented as any combination of an apparatus, a system and an integrated circuit. Further, in some embodiments, at least one of controller 802, memory 804 and interface circuit 812 may be implemented as a computer having non-transitory computer-readable media for carrying or having computer-executable instructions or data structures stored thereon.

Controller 802 can include a dedicated control circuit, CPU, microprocessor, etc. Controller 802 controls the circuits of gateway device 402. Memory 804 can store various programming, and user content, and data. Interface circuit 812 can include one or more connectors, such as RF connectors, or Ethernet connectors, and/or wireless communication circuitry, such as 5G circuitry and one or more antennas. Interface circuit 812 receives content from service provider 116 (as shown in FIG. 4) by known methods, non-limiting examples of which include terrestrial antenna, satellite dish, wired cable, DSL, optical fibers, or 5G as discussed above. Through interface circuit 812, gateway device 402 receives an input signal, including data and/or audio/video content, from service provider 116 and can send data to service provider 116.

Radio 808, (and preferably two or more radios), may also be referred to as a wireless communication circuit, such as a Wi-Fi WLAN interface radio transceiver and is operable to communicate with client devices 104, 106, 108 and with Wi-Fi extenders 404 and 406. Radio 808 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols. Gateway device 402 can also be equipped with a radio to implement a Bluetooth interface radio transceiver and antenna, which communicates wirelessly in the ISM band, from 2.400 to 2.485 GHz. As an alternative, at least one of the radios can be a RF4CE protocol, Zigbee protocol, and/or IEEE802.15.4 protocol, which also communicates in the ISM band.

Client device 404 includes: a display 832, a controller 822; a memory 824, which has stored therein an onboarding program 826; an interface circuit 830; and at least one radio, a sample of which is illustrated as a radio 828.

In this example, controller 822, memory 824 and radio 828 are illustrated as individual devices. However, in some embodiments, at least two of controller 822, memory 824, and radio 828 may be combined as a unitary device. Further, in some embodiments, at least one of controller 822 and memory 824 may be implemented as a computer having tangible computer-readable media for carrying or having computer-executable instructions or data structures stored thereon.

Controller 822, which can include a dedicated control circuit, CPU, microprocessor, etc., controls the circuits of client device 404.

As will be described in more detail below, memory 804 contains includes instructions that may be used by controller 802 to cause gateway device 402 to initiate an onboarding process to onboard a Wi-Fi extender; generate connecting graphic user interface data, for use by client device 404 to display a connecting status image associated with an operation of the gateway device 402 connecting with a Wi-Fi extender after the onboarding process is initiated; periodically check a connection status of the Wi-Fi extender, the connection status being in a first state or another state, the first state indicating that the Wi-Fi extender is connected to gateway device 402; and generate connected graphic user interface data, for use by client device 404 to display a connected status image associated with gateway device 402 being connected to a Wi-Fi extender, after a current connection status and an immediately previous connection status both indicate the first state.

As will be described in more detail below, controller 802 is additionally configured to execute instructions stored on memory 804 to cause gateway device 402 to periodically check the connection status of the Wi-Fi extender 404 at a first interval. Additionally, controller 802 may be further configured to execute instructions stored on memory 804 to cause gateway device 402 to periodically check the connection status of Wi-Fi extender 404 at a second interval when one connection status is in the first state, where the second interval is less than the first interval.

As will be described in more detail below, controller 802 is additionally configured to execute instructions stored on memory 804 to cause gateway device 402 to generate connection failure graphic user interface data, for use by the client device 404 to display a connection failure status image associated with gateway device 402 failing to connect to a Wi-Fi extender, after expiration of a predetermined time period, and a current connection status and an immediately previous connection status both fail to indicate a first state.

Returning to FIG. 5, as shown in the figure, algorithm 500 to be executed by a processor starts (S502) and the onboarding process for the Wi-Fi extender is initiated (S504). For example, returning to FIG. 4, gateway device 402 initiates the onboarding process for Wi-Fi extender 404. This will be described in greater detail with reference to FIG. 6A-C.

Figure 6A:
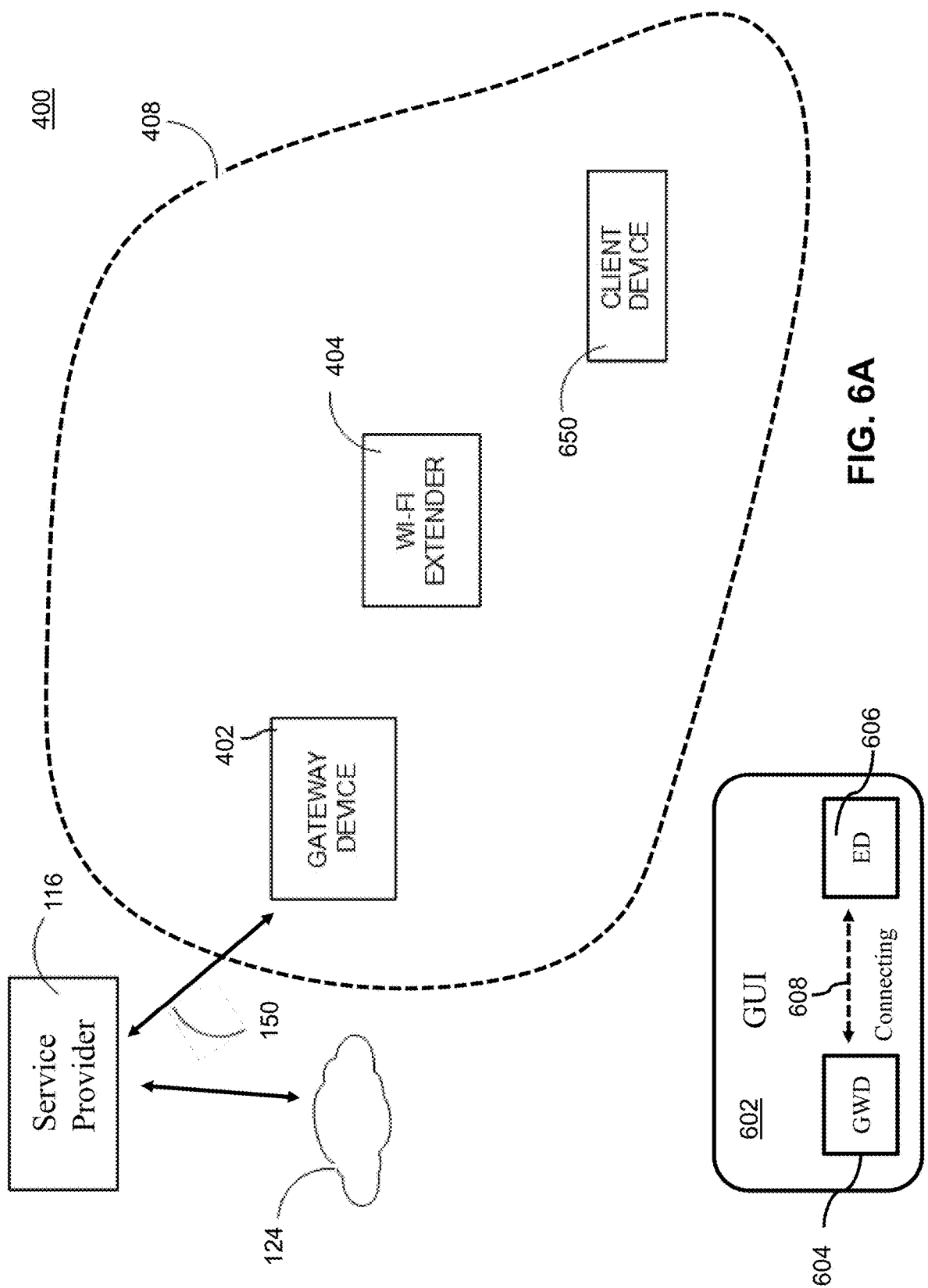
FIG. 6A illustrates a communication system at a time $t_6$ in accordance with aspects of the present disclosure.
Figure 6B:
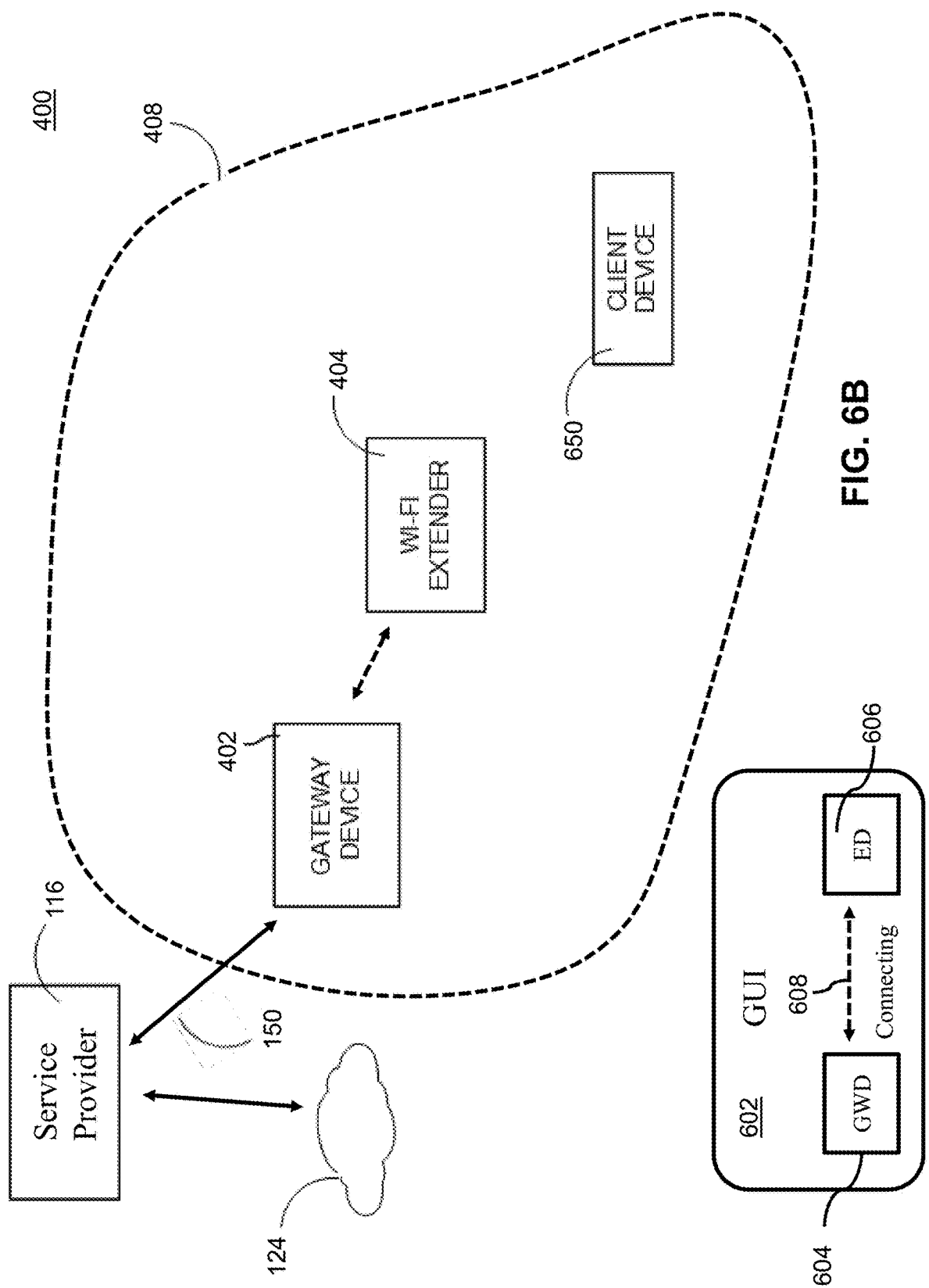
FIG. 6B illustrates the communication system time of FIG. 6A at a time $t_7$.
Figure 6C:
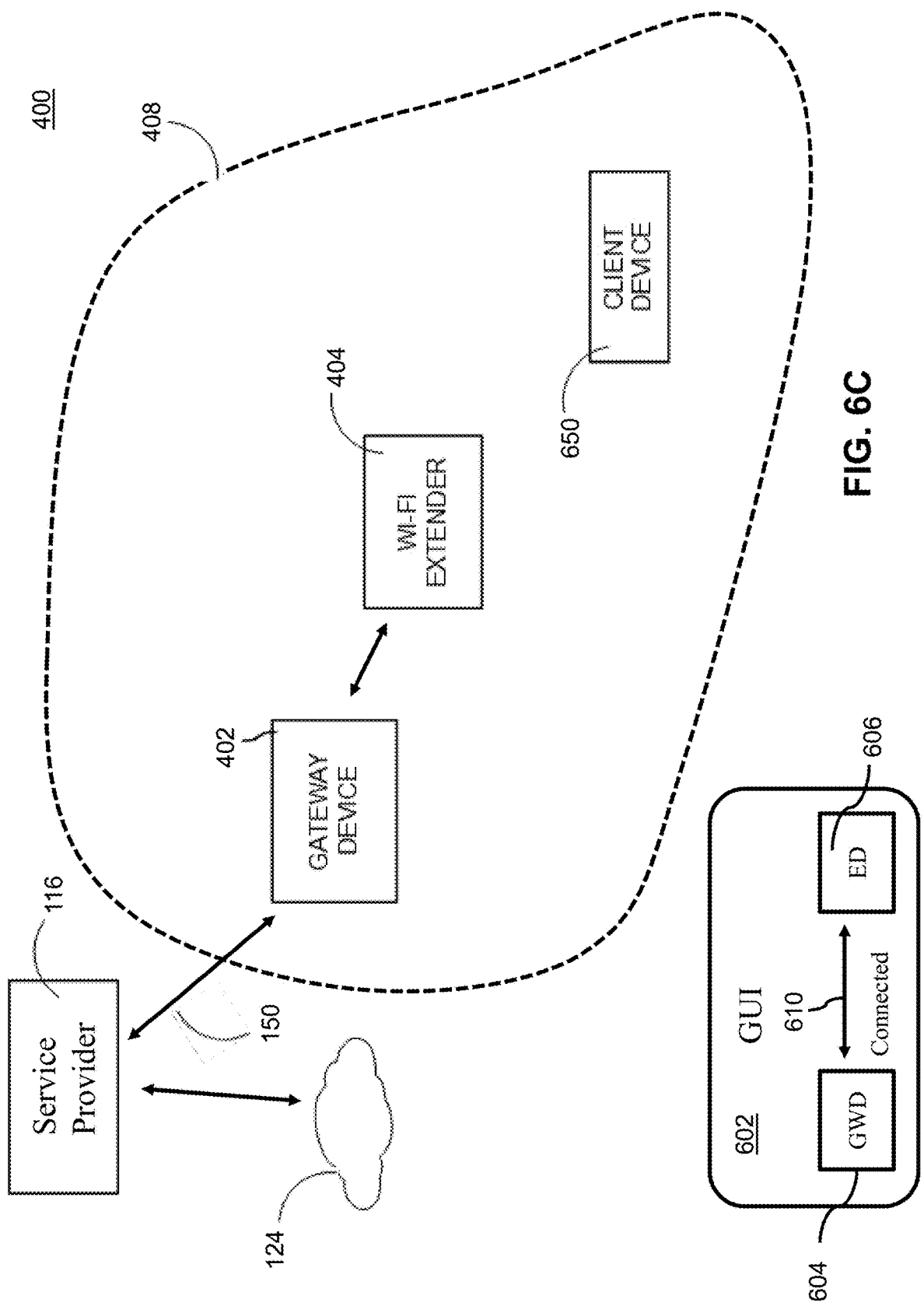
FIG. 6C illustrates the communication system time of FIG. 6A at a time $t_8$.

FIGS. 6A-C illustrate structural components of an alternate configuration of communication system 400 at three different times respectively in accordance with aspects of the present disclosure. Communication system 400 is illustrated at a time $t_6$ in FIG. 6A, at a time $t_7$ in FIG. 6B, and at a time $t_8$ in FIG. 6C.

As shown in FIGS. 6A-C, communication system 400 includes gateway device 402; client device 650; Wi-Fi extender 404; WLAN 408; service provider 116; physical media/wiring 150; external network 124, e.g., the Internet; a GUI 602, a GWD image 604; an ED image 606; and a connecting status image 608 as shown in FIGS. 6A and 6B or a connected status image 610 as shown in FIG. 6C.

FIG. 6A illustrates communication system 400 at time $t_6$.

In operation, at time $t_6$, a user is initiating the process to onboard Wi-Fi extender 404 to gateway device 402. As shown in FIG. 6A, Wi-Fi extender 404 is not connected to gateway device 402.

Returning to FIG. 5, after the onboarding process is initiated (S504), a connecting status image is generated (S506). For example, returning to FIG. 6A, GUI 602 is displaying on client device 650 that a connection is being established between Wi-Fi extender 404 and gateway device 402 by way of displaying connecting status image 608 which shows a connection is in the process of being established between GWD image 604 and ED image 606. In this non-limiting example embodiment, connecting status image 608 is a dotted double-ended arrow. However, connecting status image 608 may take the other forms that convey the meaning that a connection, or onboarding, process is in effect. Further, in some embodiments, the connecting status may be conveyed with sound, tactile responses and combinations thereof, to convey the meaning that a connection, or onboarding, process is in effect.

Returning to FIG. 5, after a connecting status image is generated (S506), the connection status of the Wi-Fi extender is checked (S508). For example, returning to FIG. 6A, after a connecting status image is generated, the connection status of Wi-Fi extender 404 is checked.

Returning to FIG. 5, after the connection status of the Wi-Fi extender is checked (S508), a first interval is established (S510). For example, returning to FIG. 6A, after the connection status of Wi-Fi extender 404 is checked, the first interval is established. This first interval is established to be long enough to enable Wi-Fi extender 404 to establish a backhaul connection with gateway device 402, and to receive connectivity to external network 124 by way of gateway device 402, physical media/wiring 150, and service provider 116. In a non-limiting example embodiment, this first interval is set to 50 seconds.

Returning to FIG. 5, after the first interval has been established (S510), the onboarding process waits for a period of time (S512). This will be described in greater detail with respect to FIG. 6B.

FIG. 6B illustrates communication system 400 of FIG. 6A at time $t_7$.

In operation, at time $t_7$, the onboarding process is not complete. As shown in FIG. 6B, Wi-Fi extender 404 has started to connect to gateway device 402 as indicated by the dashed line between Wi-Fi extender 404 and gateway device 402. GUI 602 is displaying on client device 650 that a connection is being established between Wi-Fi extender 404 and gateway device 402 by way of displaying connecting status image 608 which shows a connection is in the process of being established between GWD image 604 and ED image 606.

During the onboarding process, Wi-Fi extender 404 reboots several times, and each time it reboots, it is disconnected and reconnected to gateway device 402. This will be described with respect to FIGS. 7A-D.

FIGS. 7A-D illustrate a portion of the network of FIG. 4 to show the flow of data to Wi-Fi extender 404 at four different times respectively during the onboarding process in accordance with aspects of the present disclosure.

As illustrated in FIGS. 7A-D, service provider 116 is arranged to communicate with gateway device 402 by way of physical/media wiring 150. Gateway device 402 is arranged to communicate with Wi-Fi extender 404 by way of WLAN 408.

In this embodiment, WLAN 408 is illustrated as a wireless network. However, in some embodiments, gateway device 402 and Wi-Fi extender 404 could communicate via an Ethernet network.

Figure 7A:
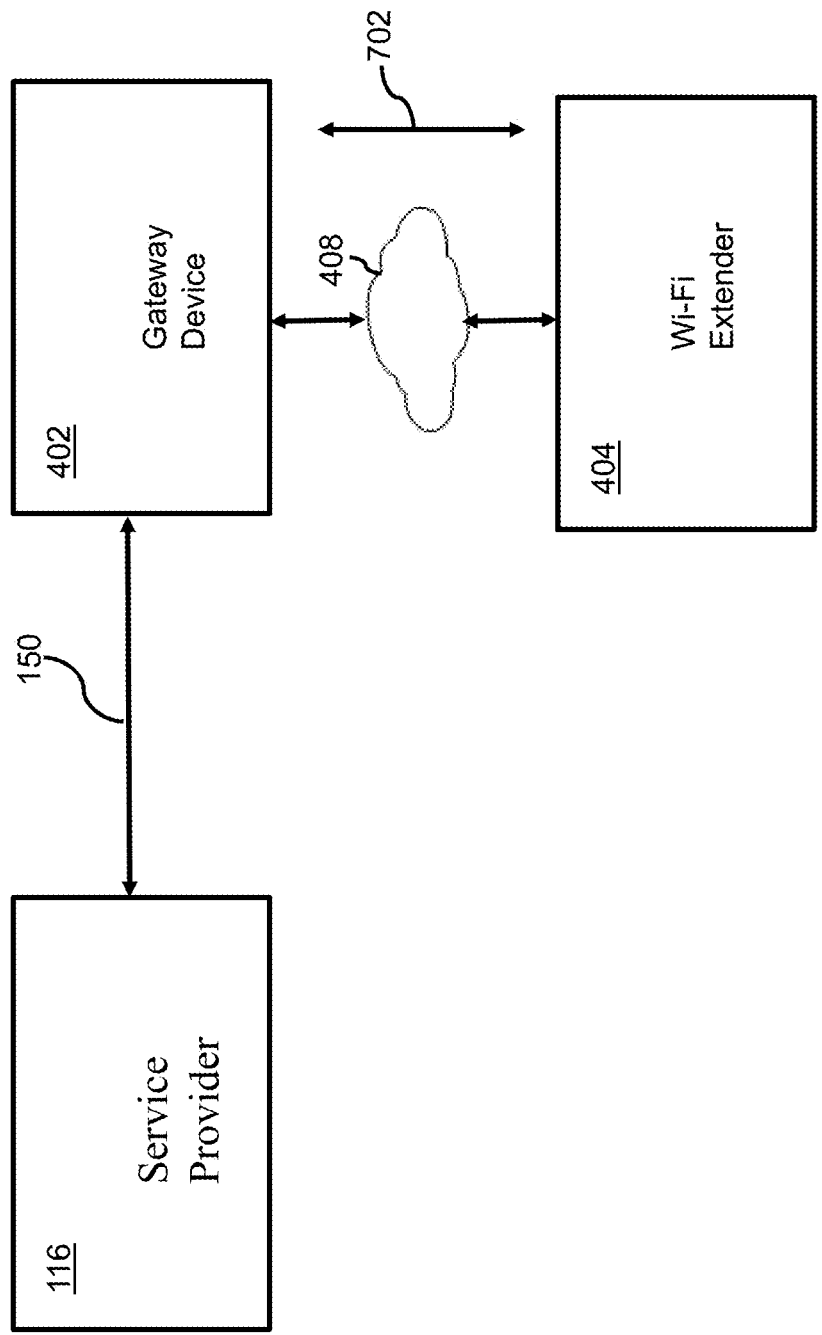
FIG. 7A illustrates a backhaul connection being established between a gateway device and a Wi-Fi extender of FIG. 4.

FIG. 7A illustrates a portion of the network of FIG. 4 to show the data flow between gateway device 402 and Wi-Fi extender 404 at the beginning of the onboarding process.

FIG. 7A illustrates a backhaul connection 702 being established between gateway device 402 and Wi-Fi extender 404. Backhaul connection 702 is indicated by a double-headed arrow between gateway device 402 and Wi-Fi extender 404.

Figure 7B:
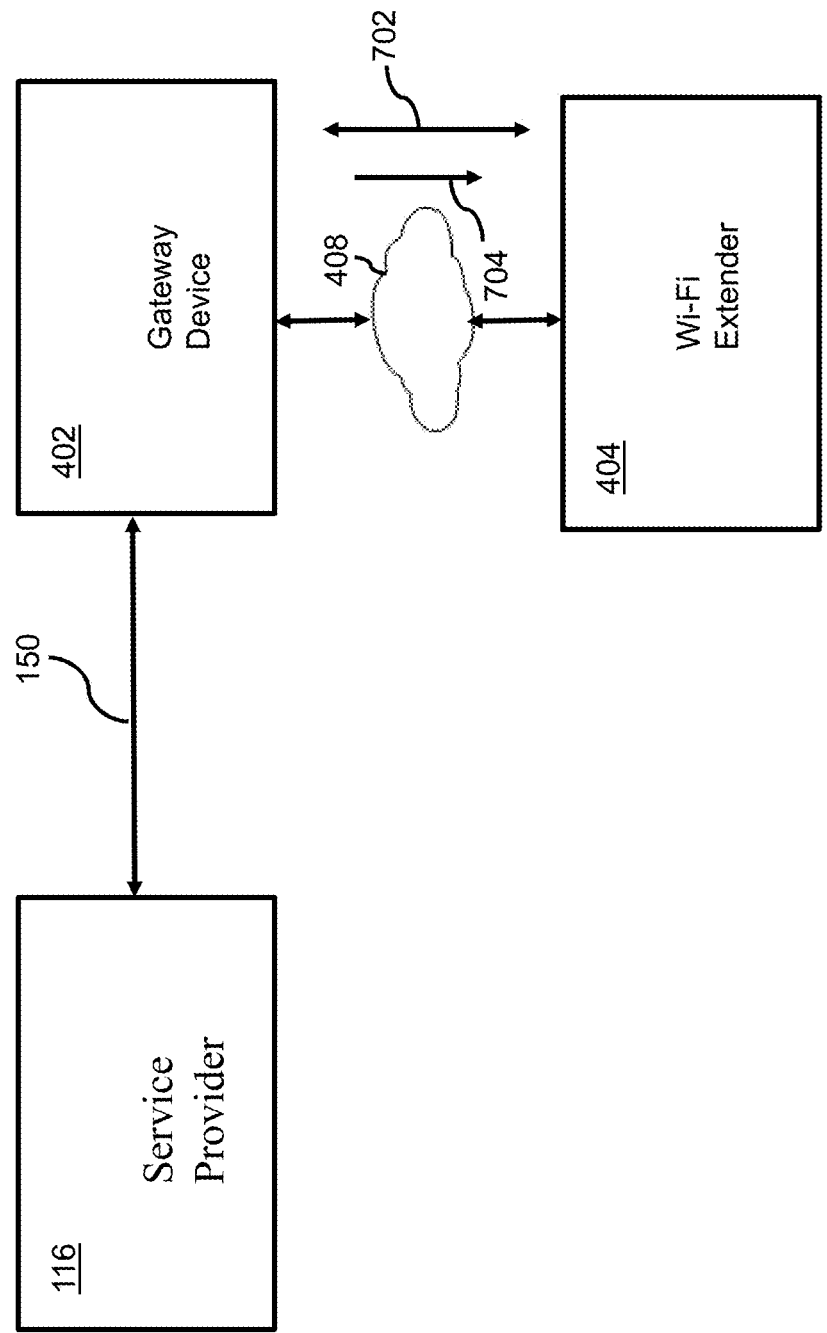
FIG. 7B illustrates a Wi-Fi extender receiving auto-configuration data from the gateway device of FIG. 4.

FIG. 7B illustrates Wi-Fi extender 404 receiving auto-configuration data from gateway device 402.

As illustrated in FIG. 7B, after backhaul connection 702 has been established, Wi-Fi extender 404 receives auto-configuration data 704 from gateway device 402. Auto-configuration data 704 is indicated by an arrow between gateway device 402 and Wi-Fi extender 404. Auto-configuration data 704 enables Wi-Fi extender 404 to appropriately configure to communicate within a Wi-Fi network as created by gateway device 402.

After Wi-Fi extender 404 receives auto-configuration data 704 from gateway device 402, Wi-Fi extender 404 reboots, wherein backhaul connection 702 is first disconnected and is then re-established between gateway device 402 and Wi-Fi extender 404. During this type of operation, in the prior art, as shown in FIG. 3B, the user would have seen that Wi-Fi extender 112 had disconnected from gateway device 102. This disconnection might confuse or even frustrate the user considering that Wi-Fi extender 112 had been connected to gateway device 102 as shown in GUI 302 of FIG. 3A.

On the contrary, in accordance with the present disclosure, as shown in FIG. 6B, instead of seeing a disconnection, the user would see connecting status image 608 and would understand that the onboarding process is still taking place.

Figure 7C:
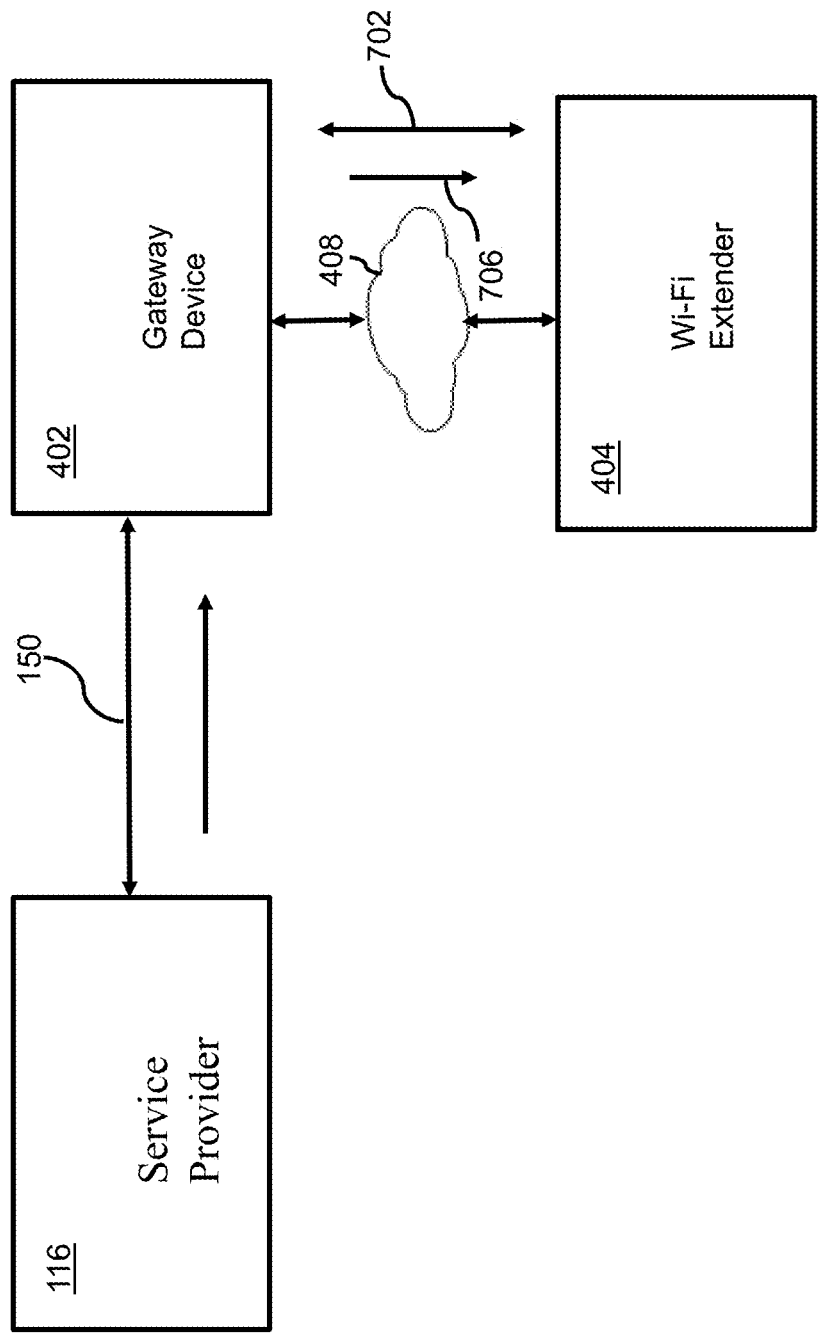
FIG. 7C illustrates the Wi-Fi extender of FIG. 4 receiving a software upgrade.

FIG. 7C illustrates Wi-Fi extender 404 receiving a software upgrade 706.

As illustrated in FIG. 7C, after backhaul connection 702 has been re-established, Wi-Fi extender 404 receives software upgrade 706, which is indicated by an arrow between gateway device 402 and Wi-Fi extender 404. It should be noted that Wi-Fi extender 404 might not need a software upgrade. However, in situations where a software upgrade is required or desired, gateway device 402 may obtain the required/desired software upgrade from service provider 116 and then provide the obtained software upgrade to Wi-Fi extender 404.

After Wi-Fi extender 404 receives a software upgrade 706 (if required/desired), Wi-Fi extender 404 reboots, wherein backhaul connection 702 is disconnected and is then re-established between gateway device 402 and Wi-Fi extender 404. During this operation, in the prior art, as shown in FIG. 3D, again the user would have seen that Wi-Fi extender 112 had disconnected from gateway device 102. Yet again, this disconnection might confuse or even frustrate the user considering that Wi-Fi extender 112 had been connected to gateway device 102 as shown in GUI 302 of FIG. 3C.

On the contrary, in accordance with the present disclosure, as shown in FIG. 6B, instead of seeing a disconnection, the user would see connecting status image 608 and would understand that the onboarding process is still taking place.

Figure 7D:
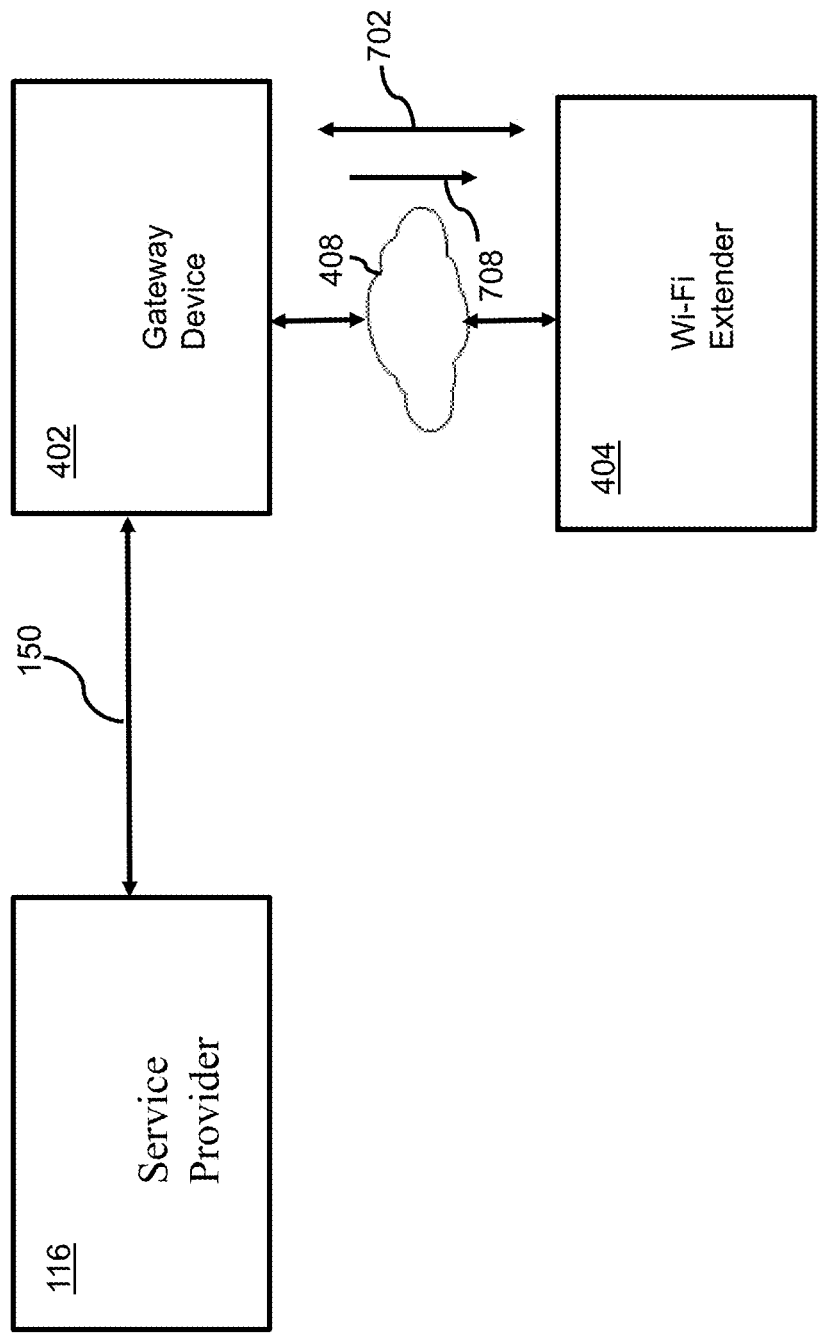
FIG. 7D illustrates the Wi-Fi extender of FIG. 4 receiving auto-configuration data from the gateway device of FIG. 4.

FIG. 7D illustrates Wi-Fi extender 404 receiving auto-configuration data 708 from gateway device 402.

Auto-configuration data 708 is indicated by an arrow between gateway device 402 and Wi-Fi extender 404. After Wi-Fi extender 404 receives auto-configuration data 708 from gateway device 402, Wi-Fi extender 404 reboots, and backhaul connection 702 is disconnected and re-established between gateway device 402 and Wi-Fi extender 404. During this operation, in the prior art, as shown in FIG. 3D, again the user would have seen that Wi-Fi extender 112 had disconnected from gateway device 102. Still yet again, this disconnection at this point would most likely frustrate the user considering that Wi-Fi extender 112 had been connected to gateway device 102 as shown in GUI 302 of FIG. 3C.

But in accordance with the present disclosure, as shown in FIG. 6B, instead of seeing a disconnection, the user would see connecting status image 608 and would understand that the onboarding process is still taking place.

Returning to FIG. 5, after the onboarding process waits for a period of time (S512), the connection status is rechecked (S514). For example, returning to FIG. 4, after the onboarding process waits for a period of time, the connection status of Wi-Fi extender 404 is rechecked.

Returning to FIG. 5, after the onboarding process is checked (S514), if the current connection status of the Wi-Fi extender is not connected (N at 516), then the onboarding process, again, waits for a period of time (S512). For example, returning to FIG. 4, after the onboarding process is checked, if Wi-Fi extender 404 has not connected to gateway device 402, then the onboarding process waits for another period of time to ensure that Wi-Fi extender 404 may establish a backhaul connection with gateway device 402, and may receive connectivity to external network 124.

Returning to FIG. 5, after the onboarding process is checked (S514), if the Wi-Fi extender current connection status is connected (Y at S516), then the onboarding process initiates a second interval (S518). For example, returning to FIG. 4, after the onboarding process is checked, if Wi-Fi extender 404 has successfully connected to gateway device 402, then the onboarding process establishes a second interval.

In example embodiments, the second interval is less than the first interval. In particular, as mentioned above (S510) the first interval should be sufficiently long enough to enable Wi-Fi extender 404 to establish a backhaul connection with gateway device 402, and to receive connectivity to external network 124 by way of gateway device 402, physical media/wiring 150, and service provider 116. After Wi-Fi extender 404 has initially established a backhaul connection with gateway device 402 and has received connectivity to external network 124, there is no longer any need to wait the long first interval, e.g., 50 seconds, to check the connection status. In a non-limiting example embodiment, the second interval is set to 20 seconds.

Returning to FIG. 5, after the second interval has been established (S518), the current connection status of the Wi-Fi extender is rechecked (S520). If the Wi-Fi extender current connection status is equal to the previous status (Y at S520), then a connected status image is generated (S522) and algorithm 500 stops (S524). For example, returning to FIG. 4, after the second interval has been established, the current connection status of Wi-Fi extender 404 is rechecked. If the current connection status of Wi-Fi extender 404 is equal to the previous connection status of Wi-Fi extender 404, then a connected status image is generated and the onboarding process stops. This will be described in greater detail with respect to FIG. 6C.

FIG. 6C illustrates communication system 400 of FIG. 6A at time $t_8$.

In operation, at time $t_8$, the onboarding process is complete. As shown in FIG. 6C, Wi-Fi extender 404 has completed the connection to gateway device 402 as indicated by the solid line between Wi-Fi extender 404 and gateway device 402. GUI 602 is displaying on client device 650 that a connection has been established between Wi-Fi extender 404 and gateway device 402 by way of displaying connected status image 610 which shows a connection has been successfully established between GWD image 604 and ED image 606.

Returning to FIG. 5, if the Wi-Fi extender current connection status is not equal to the previous status (N at S520), then the onboarding process waits for a period of time (S512) and checks the connection status of the Wi-Fi extender again (S514). For example, if the current connection status of Wi-Fi extender 404 is not equal to its previous status, then the onboarding process waits for a period of time and then checks the connection status of Wi-Fi extender 404 again.

The processes disclosed above constitute algorithms that can be affected by software, applications (apps, or mobile apps), or computer programs. The software, applications, computer programs can be stored on a non-transitory computer-readable medium for causing a computer, such as one or more processors, to execute the processes described herein and shown in the drawing figures.

Wi-Fi extenders are an important part of wireless local area networks because they extend the reach of Wi-Fi signals. However, when conventional Wi-Fi extenders are being onboarded, the user will often see multiple dropped connection signals during the onboarding process. A user who sees multiple dropped connections during the onboarding process may incorrectly assume that a Wi-Fi extender is defective.

In accordance with the present disclosure, a system and method are provided that indicate to the user when a Wi-Fi extender is being onboarded and when the onboarding process is complete.

By preventing the user from being aware of the multiple dropped connections during the Wi-Fi extender onboarding process, the present disclosure provides a better user experience and reduces unnecessary returns and service calls for a Wi-Fi extender that is not defective.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A network access point device for use with a network extender device and a display device, said network access point device comprising:
    a memory; and
    a processor configured to execute instructions stored on said memory to cause said network access point device to:
        initiate an onboarding process to onboard the network extender device;
        generate connecting graphic user interface data, for use by the display device to display a connecting status image associated with an operation of said network access point device connecting with the network extender device, after the onboarding process is initiated;
        periodically check, at a first interval, a connection status of the network extender device, the connection status being in a first state or another state, the first state indicating that the network extender device is connected to said network access point device;
        generate connected graphic user interface data, for use by the display device to display a connected status image associated with said network access point device being connected to the network extender device, after a current connection status and an immediately previous connection status both indicate the first state;
        check the connection status of the network extender device at a second interval when one connection status is in the first state,
        wherein the second interval is less than the first interval.

2. The network access point device of claim 1, wherein said processor is configured to execute instructions stored on said memory to cause said network access point device to generate connection failure graphic user interface data, for use by the display to display a connection failure status image associated with said network access point device failing to connect to the network extender device, after expiration of a predetermined time period, and a current connection status and an immediately previous connection status both fail to indicate a first state.

3. A method of operating a network access point device for use with a network extender device and a display device, said method comprising:
- initiating, via a processor, an onboarding process to onboard the network extender device;
- generating, via the processor, connecting graphic user interface data, for use by the display device to display a connecting status image associated with an operation of the network access point device connecting with the network extender device, after the onboarding process is initiated;
- periodically checking at a first interval, via the processor, a connection status of the network extender device, the connection status being in a first state or another state, the first state indicating that the network extender device is connected to the network access point device;
- generating, via the processor, connected graphic user interface data, for use by the display device to display a connected status image associated with the network access point device being connected to the network extender device, after a current connection status and an immediately previous connection status both indicate the first state; and
- checking, via the processor, the connection status of the network extender device at a second interval when one connection status is in the first state,
- wherein the second interval is less than the first interval.

4. The method of claim 3, further comprising generating, via the processor, connection failure graphic user interface data, for use by the display to display a connection failure status image associated with said network access point device failing to connect to the network extender device, after expiration of a predetermined time period, and a current connection status and an immediately previous connection status both fail to indicate a first state.

5. A non-transitory, computer-readable media having computer-readable instructions stored thereon, the computer-readable instructions being capable of being read by a network access point device for use with a network extender device and a display device, wherein the computer-readable instructions are capable of instructing the network access point device to perform the method comprising:
- initiating, via a processor, an onboarding process to onboard the network extender device;
- generating, via the processor, connecting graphic user interface data, for use by the display device to display a connecting status image associated with an operation of the network access point device connecting with the network extender device, after the onboarding process is initiated;
- periodically checking at a first interval, via the processor, a connection status of the network extender device, the connection status being in a first state or another state, the first state indicating that the network extender device is connected to the network access point device;
- generating, via the processor, connected graphic user interface data, for use by the display device to display a connected status image associated with the network access point device being connected to the network extender device, after a current connection status and an immediately previous connection status both indicate the first state; and
- checking, via the processor, the connection status of the network extender device at a second interval when one connection status is in the first state,
- wherein the second interval is less than the first interval.

6. The non-transitory, computer-readable media of claim 5, wherein the computer-readable instructions are capable of instructing the network access point device to perform the method further comprising generating, via the processor, connection failure graphic user interface data, for use by the display to display a connection failure status image associated with said network access point device failing to connect to the network extender device, after expiration of a predetermined time period, and a current connection status and an immediately previous connection status both fail to indicate a first state.

7. A client device for use with a network access point device and a network extender device, said client device comprising:
- a display;
- a memory; and
- a processor configured to execute instructions stored on said memory to cause said client device to:
  - initiate an onboarding process to onboard the network extender device to the network access point device;
  - receive, from the network access point device, connecting graphic user interface data for use by said display to display a connecting status image associated with an operation of the network access point device connecting with the network extender device, after the onboarding process is initiated; and
  - receive, from the network access point device, connected graphic user interface data for use by said display to display a connected status image associated with the network access point device being connected to the network extender device,
  - wherein the graphic user interface data for use by said display to display a connected status image is derived from a current check of a current connection status of the network extender device and an immediately previous check of an immediately previous connection status of the network extender device,
  - wherein the connection status being in a first state or another state,
  - wherein the first state indicating that the network extender device is connected to the network access point device, and
  - wherein the current connection status and the immediately previous connection status both indicate the first state.

8. A method of operating a client device for use with a network access point device and a network extender device, said method comprising:
- initiate, via a processor, an onboarding process to onboard the network extender device to the network access point device;
- receiving, via the processor and from the network access point device, connecting graphic user interface data for use by a display to display a connecting status image associated with an operation of the network access point device connecting with the network extender device, after the onboarding process is initiated; and
- receiving, via the processor and from the network access point device, connected graphic user interface data for use by the display to display a connected status image associated with the network access point device being connected to the network extender device, wherein the graphic user interface data for use by the display to display a connected status image is derived from a current check of a current connection status of the network extender device and an immediately previous check of an immediately previous connection status of the network extender device, wherein the connection status being in a first state or another state, wherein the first state indicating that the network extender device is connected to the network access point device, and wherein the current connection status and the immediately previous connection status both indicate the first state.

\* \* \* \* \*